(12) United States Patent
Lu

(10) Patent No.: US 8,072,904 B2
(45) Date of Patent: Dec. 6, 2011

(54) COMMUNICATION NETWORK APPARATUS AND METHOD

(75) Inventor: Xiaolin Lu, Middletown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 435 days.

(21) Appl. No.: 11/867,895

(22) Filed: Oct. 5, 2007

(65) Prior Publication Data

US 2008/0031158 A1    Feb. 7, 2008

Related U.S. Application Data

(60) Division of application No. 10/328,262, filed on Dec. 23, 2002, now Pat. No. 7,298,710, which is a continuation of application No. 09/328,416, filed on Jun. 9, 1999, now Pat. No. 6,584,102.

(60) Provisional application No. 60/113,245, filed on Dec. 21, 1998.

(51) Int. Cl.
 *H04L 12/28* (2006.01)

(52) U.S. Cl. .................. 370/254; 370/469; 370/474

(58) Field of Classification Search .................. 370/237, 370/238, 238.1, 328, 329, 351, 352, 389, 370/390, 392, 395.3, 395.31, 395.32, 401, 370/408, 411, 254–256, 474, 475
See application file for complete search history.

(56) References Cited

U.S. PATENT DOCUMENTS

| | | | |
|---|---|---|---|
| 4,393,456 A | 7/1983 | Marshall, Jr. | |
| 4,777,612 A | 10/1988 | Tomimitsu | |
| 5,076,672 A | 12/1991 | Tsuda et al. | |
| 5,289,303 A | 2/1994 | Cloonan et al. | |
| 5,290,419 A | 3/1994 | Kambara et al. | |
| 5,363,439 A | 11/1994 | Mitsuhiko | |
| 5,365,344 A | 11/1994 | Eda et al. | |
| 5,392,449 A | 2/1995 | Shaughnessy et al. | |
| 5,430,730 A | 7/1995 | Sepulveda-Garese et al. | |
| 5,450,224 A | 9/1995 | Johansson | |
| 5,452,291 A * | 9/1995 | Eisenhandler et al. | ....... 370/402 |
| 5,465,251 A | 11/1995 | Judd et al. | |
| 5,491,690 A | 2/1996 | Alfonsi et al. | |
| 5,495,479 A | 2/1996 | Galaand et al. | |

(Continued)

FOREIGN PATENT DOCUMENTS

EP    520494 A2    12/1992

*Primary Examiner* — Hassan Phillips
*Assistant Examiner* — Mark A Mais

(57) ABSTRACT

A communication network apparatus and method for routing communication signals from a source device to a receiving device. The apparatus performs only local processing on communication signals to thereby increase the speed of processing the signals. A plurality of the processing nodes are combined into a plurality of sub-networks that comprise the network apparatus. Each processing node of a sub-network need only process address information pertaining to the node's current layer, one layer above it, if any, and one layer below it, if any. Additionally, each processing node has associated communication signal frequencies/wavelengths that identify the processing node as the intended recipient of the communication signal. When a communication signal having a carrier signal with a frequency/wavelength corresponding to the processing node is received, the processing node demodulates the carrier signal and forwards the communication signal data to a processing module used to process address information to determine how to route the communication signal through the network. Communication signals may be assigned "express" frequencies/wavelengths, in which case, all of the processing nodes, except the destination processing node, of the network pass the communication signal without performing processing on the communication signal.

12 Claims, 14 Drawing Sheets

U.S. PATENT DOCUMENTS

| | | | |
|---|---|---|---|
| 5,506,713 A | 4/1996 | Okamoto et al. | |
| 5,530,963 A * | 6/1996 | Moore et al. | 709/243 |
| 5,544,161 A | 8/1996 | Bigham et al. | |
| 5,652,751 A | 7/1997 | Sharony | |
| 5,673,265 A * | 9/1997 | Gupta et al. | 370/432 |
| 5,717,618 A | 2/1998 | Menkhoff et al. | |
| 5,734,962 A | 3/1998 | Hladik et al. | |
| 5,739,945 A | 4/1998 | Tayebati | |
| 5,848,059 A | 12/1998 | Yamamoto | |
| 5,870,564 A * | 2/1999 | Jensen et al. | 709/241 |
| 5,946,679 A * | 8/1999 | Ahuja et al. | 1/1 |
| 5,987,011 A * | 11/1999 | Toh | 370/331 |
| 6,011,795 A * | 1/2000 | Varghese et al. | 370/392 |
| 6,014,545 A | 1/2000 | Wu et al. | |
| 6,038,357 A | 3/2000 | Pan | |
| 6,061,484 A | 5/2000 | Jones et al. | |
| 6,067,585 A * | 5/2000 | Hoang | 710/11 |
| 6,125,221 A | 9/2000 | Bergmann et al. | |
| 6,125,365 A | 9/2000 | Nakatsugawa | |
| 6,154,583 A | 11/2000 | Kuroyanagi et al. | |
| 6,161,011 A | 12/2000 | Loveless | |
| 6,192,051 B1 * | 2/2001 | Lipman et al. | 370/389 |
| 6,335,919 B1 | 1/2002 | Maegawa | |
| 6,385,174 B1 * | 5/2002 | Li | 370/252 |
| 6,584,102 B1 | 6/2003 | Lu | |
| 6,594,655 B2 * | 7/2003 | Tal et al. | 1/1 |
| 6,611,528 B1 * | 8/2003 | Farinacci et al. | 370/432 |
| 7,203,175 B2 * | 4/2007 | Thubert et al. | 370/254 |
| 7,246,148 B1 * | 7/2007 | Phillips et al. | 709/203 |
| 7,366,113 B1 * | 4/2008 | Chandra et al. | 370/255 |
| 7,428,221 B2 * | 9/2008 | Thubert et al. | 370/255 |
| 7,443,858 B1 * | 10/2008 | Cheriton et al. | 370/395.1 |
| 7,475,156 B2 * | 1/2009 | Kerr et al. | 709/238 |
| 7,583,665 B1 * | 9/2009 | Duncan et al. | 370/389 |
| 7,830,885 B2 | 11/2010 | Lu | |
| 2002/0048264 A1 | 4/2002 | Maegawa | |
| 2003/0142634 A1 | 7/2003 | Lu | |
| 2003/0204625 A1 * | 10/2003 | Cain | 709/243 |
| 2009/0003291 A1 * | 1/2009 | Chu et al. | 370/338 |

* cited by examiner

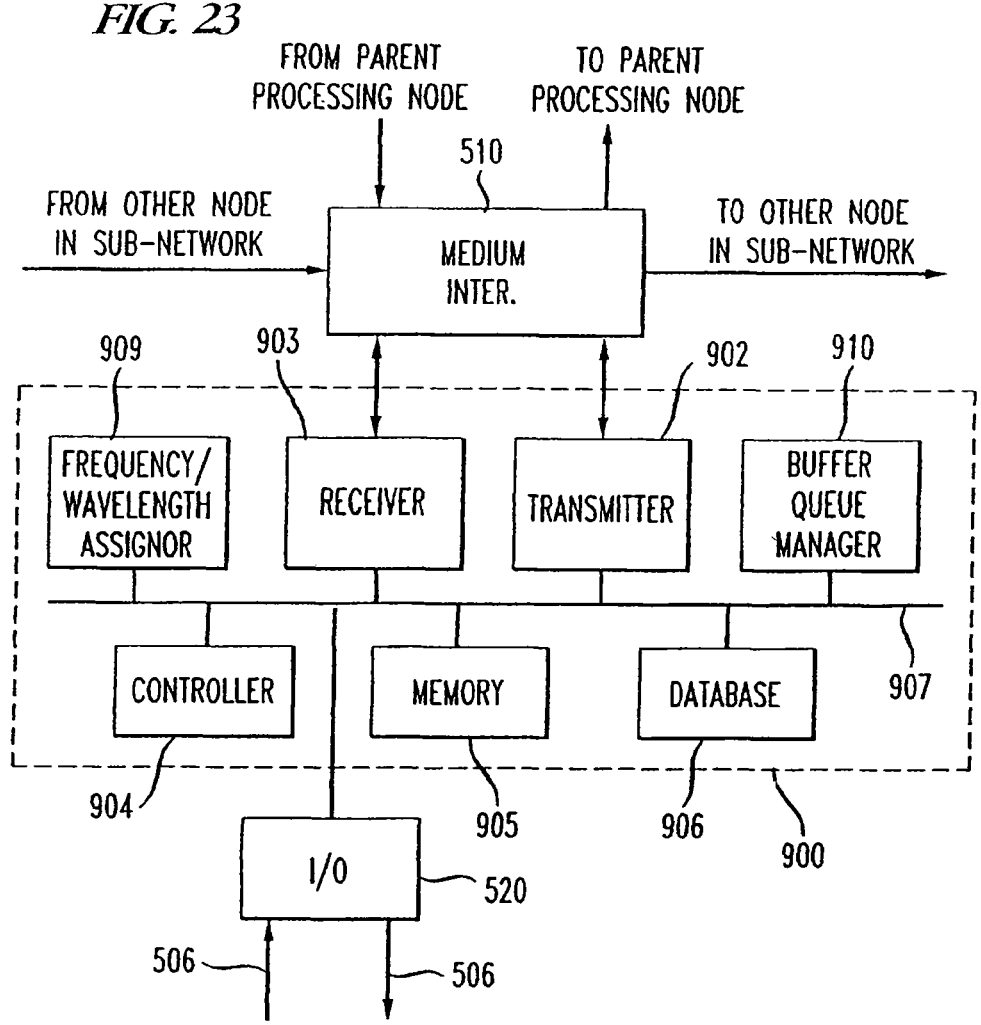

COMMUNICATION NETWORK APPARATUS AND METHOD

RELATED APPLICATIONS

This non-provisional application is a divisional of U.S. non-provisional application Ser. No. 10/328,262 entitled "Communication Network Apparatus and Method", filed on Dec. 23, 2002 now U.S. Pat. No. 7,298,710, which is a continuation of U.S. non-provisional application Ser. No. 09/328,416 entitled "Communication Network Apparatus and Method", filed on Jun. 9, 1999, now issued U.S. Pat. No. 6,584,102, which claims the benefit of U.S. provisional application No. 60/113,245 entitled "Communication Network Apparatus and Method" filed on Dec. 21, 1998, each of which is herein incorporated by reference.

BACKGROUND OF THE INVENTION

1. Field of Invention

This invention pertains to an apparatus and method for routing communication signals from a source device to a destination device.

2. Description of Related Art

Conventional networks require routers and switches to process full destination addresses in order to route communication signals to a destination device. Buffers within the routers and switches that queue the communication signals must account for the full destination addresses of communication traffic that circulates through the routers and switches. The routers and switches must process all incoming traffic regardless of its destination and must process each element of the entire address of each incoming communication signal. Thus, the routers and switches must perform global routing on every communication signal that is received. Furthermore, the routers and switches must know the entire topology of the network in order to route each of the incoming communication signals. Thus, high volume communication signals destined to one address may become a bottleneck to low volume communication signals destined to another address. Therefore, there is a need for new technology to relieve such bottleneck conditions and to generally improve communication network efficiency.

SUMMARY OF THE INVENTION

The present invention is directed to a plurality of processing nodes, organized into a network that route communication signals from a source device to a destination device. Each of the processing nodes include a processing module and a medium interface. The processing module of a processing node performs only local processing on communication signals to thereby increase the speed and efficiency of processing the signals. Local processing involves processing portions of an address as a single entity. Global routing of communication signals is accomplished by the medium interface of the processing node.

The network is divided into sub-networks of processing nodes. Addresses of devices and processing nodes are also organized based on the sub-network structure and are divided into three portions. For each processing node, a first portion relates to addresses of other processing nodes that are in sub-networks that are "above" the sub-network of the processing node; a second portion relates to addresses of other processing nodes that are within the "same" sub-network as the processing node; and a third portion relates to addresses of processing nodes or devices that are in sub-networks that are "below" the sub-network of the processing node or are "child" devices of the processing node, respectively. Each of the three portions of the address is treated as one entity. The processing module of each processing node of a sub-network processes address information in terms of these three portions. Thus, in this sense, the process module processes only addresses that are local to the processing node. Accordingly, each node need not perform global routing processing on the received communication signals.

Additionally, each processing node may be associated with carrier signal frequencies/wavelengths that identify the processing node as the intended recipient of the carrier signal. When a received carrier signal has a frequency/wavelength corresponding to the processing node, the processing module of the processing node receives the carrier signal and processes address information modulated on the carrier signal to determine how to route the communication signal through the network. Carrier signals of other frequencies/wavelengths are passed on to other processing nodes by the medium interface without processing by the processing module of the processing node.

BRIEF DESCRIPTION OF THE DRAWINGS

The invention is described in detail with reference to the following figures wherein like numbers designate like elements, and wherein:

FIG. 22 shows a database for use with the masking process of FIG. 21;

FIG. 23 is an exemplary block diagram of a processing module of a processing node according to the present invention.

DETAILED DESCRIPTION OF PREFERRED EMBODIMENTS

Figure 1:
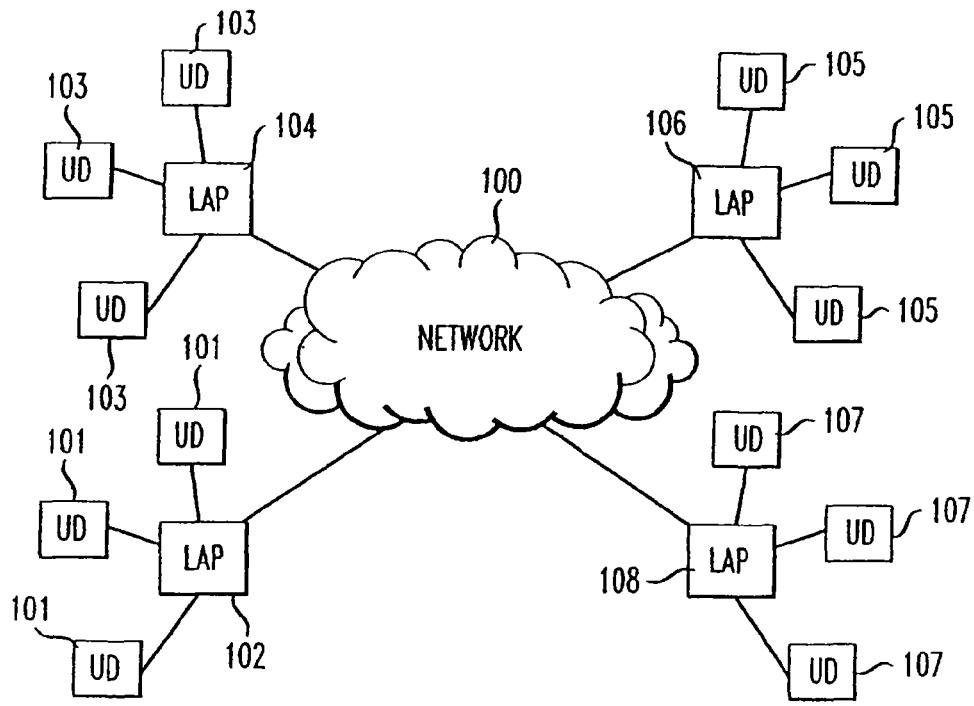
FIG. 1 is an exemplary diagram of a communication network.

FIG. 1 shows a general diagram of a network structure. As shown in FIG. 1, a plurality of user devices 101, 103, 105 and 107 are connected via communication links to local access providers (LAPs) 102, 104, 106 and 108. The LAPs 102, 104, 106 and 108 are in turn connected to the network 100. Reference numerals 101, 103, 105 and 107 refer to user devices that are associated with LAPs 102, 104, 106 and 108, respectively. When a user device is identified using one of the reference numerals 101, 103, 105 and 107, it is intended to indicate anyone of the user devices so labeled. The context will explicitly state when more than one of the user devices is intended.

When a user device 101 desires to communicate with a user device 105, for example, communication signals are sent from the user device 101 through the LAP 102 to the network 100. The network 100 routes the communication signals by way of switches and routers in the network 100 to the LAP 106 which then forwards the communication signals to the appropriate user device 105. The communication signals include address information that is used to direct the routing of the communication signals through the network 100.

Figure 2:
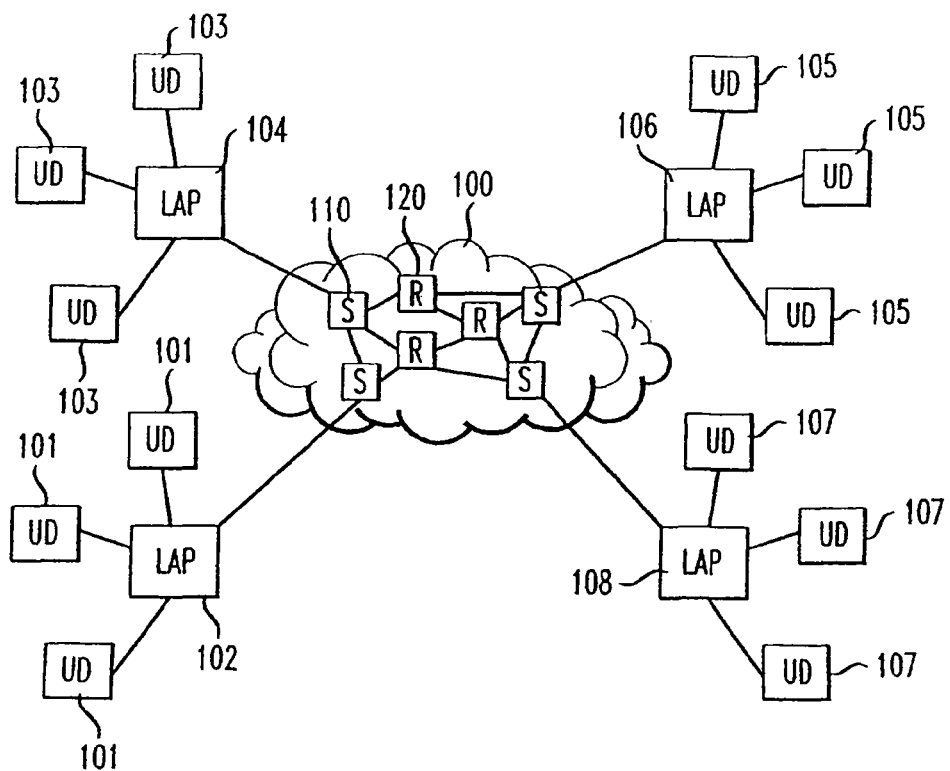
FIG. 2 is a diagram of a network architecture.

FIG. 2 shows a network architecture for facilitating the routing of communication signals through the network 100. The network 100 includes a plurality of switches "S" 110 and routers "R" 120 where each of the switches 110 and routers 120 are able to send and receive signals to any other switch 110 and/or router 120 in the network 100 through one or more of the other switches 110 or routers 120. Each switch 110 and router 120 processes the complete address information of received communication signals in order to direct the communication signals to their respective destinations. Thus, each switch 110 and router 120 in the network 100 performs global routing processes for all received communication signals.

Figure 3:
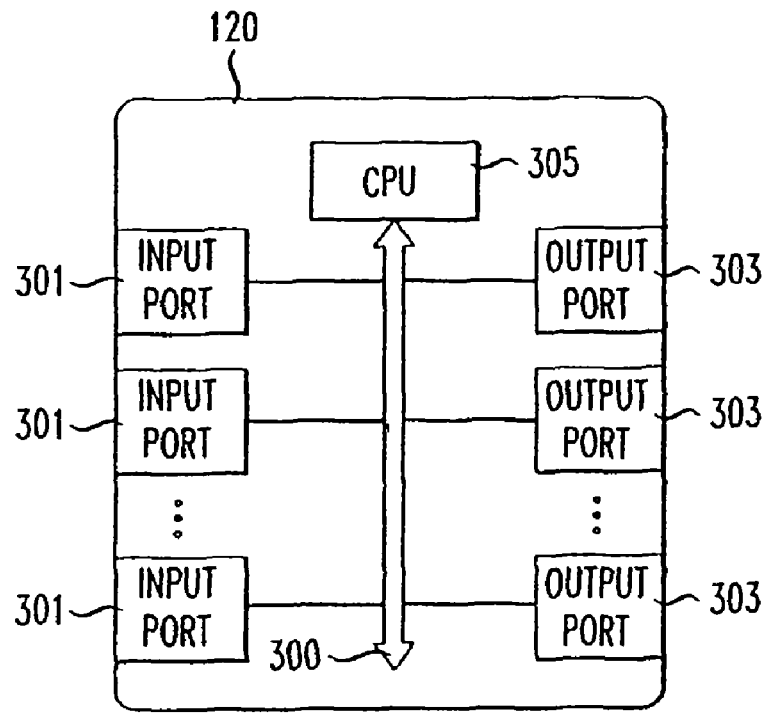
FIG. 3 is a diagram of a router for use with the network of FIG. 2.

FIG. 3 is an exemplary diagram of a conventional router 120. The router 120 may have a plurality of input ports 301 and a plurality of output ports 303. Both the input and output ports 301 and 302 may be connected via a bus 300 and controlled by a central processing unit (CPU) 305, for example. Communication signals received in anyone of the input ports 301 are processed by the CPU 305 and routed by the CPU 305 to anyone of the output ports 303 via the bus 300. Thus, the CPU 305 and the bus 300 may be "bottlenecks" during high volume congestion conditions.

In addition, communication signals, such as data packets, are queued serially at each of the input and output ports 301 and 303. If the lead data packet (the data packet to—be transferred next) of one of the input ports 301 is destined to an output port that is full due to backup congestion of the network 100, for example, then the other data packets behind the lead data packet cannot be transferred to their respective output ports 303, even if these output ports 303 have room for the data packet. Thus, congestion at one output port 303 adversely affects transfer rates of other output ports 303.

Figure 4:
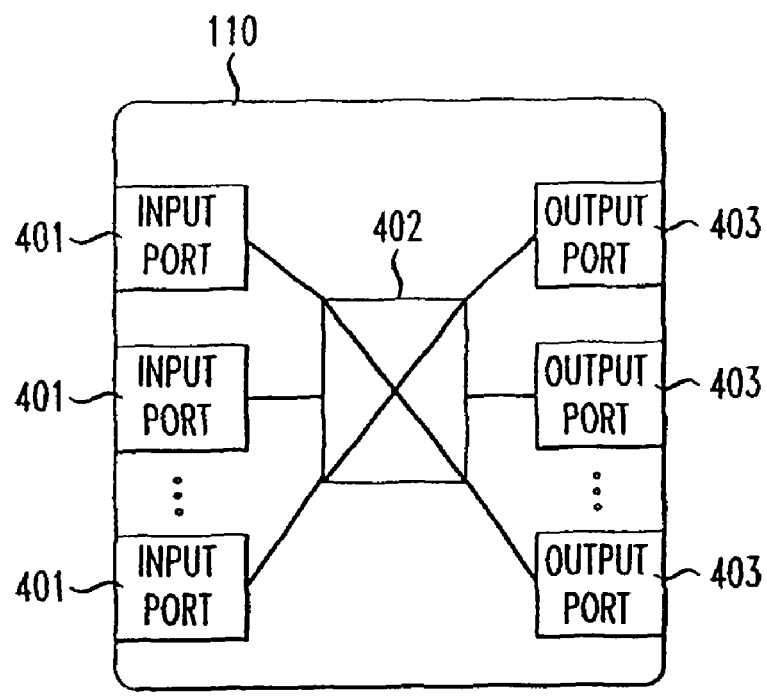
FIG. 4 is a diagram of a switch for use with the network of FIG. 2.

FIG. 4 is an exemplary diagram of a conventional switch 110. The switch 110 includes a plurality of input ports 401 and a plurality of output ports 403 connected via a crossbar switch 402, for example. While the crossbar switch 402 eliminates the congestion problem of the bus 300 in the router 120, output port congestion problems described above remain unresolved.

The efficiency of the network 100 may be significantly increased by organizing the network 100 into groups of processing nodes and interconnecting the processing nodes via respective medium interfaces. Each of the groups of processing nodes make up a sub-network. The relationship among the sub-networks may be described using the words "same," "above," and "below," for example. When a first sub-network is directly "above" a second sub-network, the first sub-network receives all communication signals from the second sub-network that are not destined to a processing node within the second sub-network. Correspondingly, when a third sub-network is directly "below" the second sub-network, all the communication signals destined to devices not "below" the third sub-network are received by the second sub-network. Processing nodes of the "same" sub-network may directly communicate without communication signals traversing other processing nodes that are above or below the "same" sub-network.

The words "same," "above," and "below" do not restrict the network organization into a hierarchical structure because there is no requirement that the first sub-network cannot be both above and below the second sub-network, for example. As used in the following description of the embodiments of this invention, a sub-network means a plurality of processing nodes that are logically or physically linked in such a way that they form a sub-group of a network. Communication signals are transmitted between processing nodes based on the sub-network organization.

Figure 5:
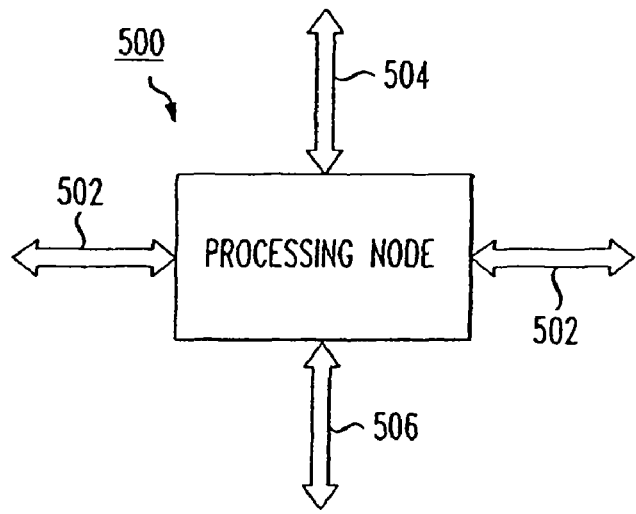
FIG. 5 is an exemplary diagram of a processing node.

FIG. 5 shows an exemplary block diagram of one of the processing nodes 500. As discussed above, the processing nodes 500 are grouped together to form sub-networks. Each processing node 500 has at least three interfaces with respect to the sub-network organization. Interface 502 couples a particular processing node 500 to other processing nodes 500 of the same sub-network. Interface 504 couples the processing node 500 to processing nodes 500 of sub-networks that are above (above sub-networks) the sub-network of the particular processing node 500. Interface 506 couples the processing node 500 to processing nodes 500 of sub-networks or devices that are below (below sub-networks) the sub-network of the particular processing node 500.

Figure 6:
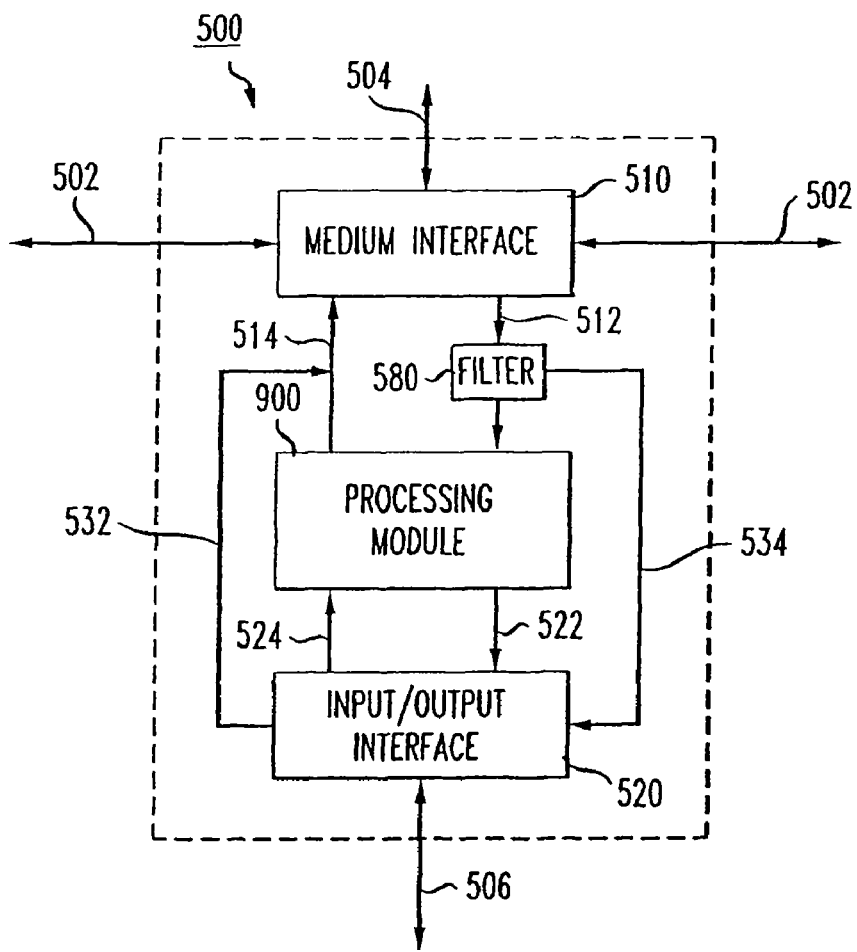
FIG. 6 is a more detailed diagram of the processing node of FIG. 5.

FIG. 6 is a more detailed exemplary block diagram of processing node 500. As shown in FIG. 6, the processing node 500 includes a medium interface 510, a processing module 900 and an input/output interface 520. The medium interface 510 sends and receives communication signals to medium interfaces 510 of other processing nodes 500 within the same sub-network via interface 502, to input/output interfaces 520 of other processing nodes 500 in above sub-networks via interface 504, and to medium interfaces 510 of other processing nodes 500 in below sub-networks via the interface 506.

While the medium interface 510 may route communication signals from any sub-network to any other sub-network, Table 1 shows the preferred routing possibilities of the communication signals using the medium interface 510. As shown in Table 1, communication signals may be routed from below, same and above sub-networks to below, same and above sub-networks with two preferred exceptions. Communication signals from below sub-networks are preferably not routed through the medium interface 510 to other below sub-networks because these communication signals may be more efficiently handled by the input/output interface 520. Communication signals from above sub-networks are preferably not routed to other above sub-networks through the medium interface 510 because such communication signals may be better handled directly by the above sub-networks.

TABLE 1

Preferred Communication Signal Routings

|  | To Below Sub-Net | To Same Sub-Net | To Above Sub-Net |
|---|---|---|---|
| From Below Sub-Net | XXXXXX | YES | YES |
| From Same Sub-Net | YES | YES | YES |
| From Above Sub-Net | YES | YES | XXXXXX |

Additionally, as described in greater detail hereafter, certain communication signals may be "express" communication signals that are capable of bypassing the processing module 900 altogether. Whether a communication signal is "express" or "non-express" may be determined in many different ways. For example, a subscriber may subscribe to "express" service when subscribing to network service. A user may request express service when initiating a communication. Certain destination addresses may be designated "express," such as emergency destination addresses, hotlines, and the like. Alternatively, the network itself may designate a communication signal to be "express" based on a network status. Any manner of designating a communication signal to receive "express" treatment is intended to be within the spirit and scope of the invention.

In these cases, no processing of the communication signal is performed by the processing module 900 and the express communication signals traverse the network 100 from one medium interface 510 to another until a processing node 500 is reached where the express communication signals are not "express" and are processed by that processing module 900. Thus, communication signals may be "express" in some processing nodes 500 and "non-express" in other processing nodes 500.

Non-express communication signals that are destined to below sub-networks or below devices with respect to the processing node 500 are directed to the processing module 900 through communication link 512. The processing module 900 processes received communication signals and sends the processed communication signals to the input/output interface 520 for output through interface 506 to the below sub-networks or below devices. Non-express communication signals received from a below device or a processing node in a below sub-network are passed to the processing module 900 via interface 506, received by the input/output interface 520 and sent to the processing module 900 via communication link 524. These communication signals are processed by the processing module 900, output to the medium interface 510, and then forwarded to other processing nodes 500 of the same or above sub-networks via the interfaces 502 or 504, respectively, or to another below sub-network or below device via interface 506.

As noted above, in certain instances, communication signals may be considered "express" communication signals that allow the processing node 500 to route the communication signals while bypassing the processing module 900. In these cases, the "express" communication signals are assigned attributes that designate the communication signal to be an express communication signal. When a processing node 500 receives a communication signal that has the attribute defined as "express," the processing node 500 routes the communication signal without being processed by the processing module 900.

For example, if the processing node 500 of FIG. 6 receives a communication signal that is express, from a below sub-network processing node 500, the input/output interface 520 separates express communication signals by filtering, for example, so that they bypass the processing module 900. The express communication signal is passed to the medium interface 510 via the communication link 532 thereby bypassing the processing module 900. The medium interface 510 receives the express communication signals and routes the express communication signals to another processing node 500 in the same sub-network via the interface 502 or to the medium interface of another processing node 500 of an above sub-network via the interface 504.

Similarly, express communication signals from processing nodes 500 in above sub-networks may bypass the processing module 900 via the filter 580, for example, and communication link 534. The filter 580 performs a similar function to that of input/output interface 520 in separating express communication signals so that they may bypass the processing module 900. The filter 580 may be a separate element (as shown) or may be incorporated, for example, into the medium interface 510.

Likewise, express communication signals may be received from processing nodes 500 in the same sub-network. In this case, if the express communication signals are destined for a processing node 500 in a sub-network that is only reachable through an above sub-network, the medium interface 510 routes the express communication signals to the above sub-network through interface 504 without the express communication signals being processed by the processing module 900. If the express communication signals are destined for a processing node 500 that is reachable by another processing node 500 in the same sub-network, the medium interface 510 passes the express communication signals to another node in the same sub-network via interface 502.

Otherwise, if the express communication signals are destined for a processing node 500 reachable through the present processing node 500, the medium interface 510 routes the express communication signals to the destination processing node via the communication link 512, the filter 580, the communication link 534, the input/output interface 520 and the interface 506. Alternatively, if the express communication signals are destined for a child device of the present processing node 500, the express communication signals are processed in a similar fashion as other non-express communication signals, by the processing module 900 and routed to the appropriate child device through the communication link 522, the input/output interface 520 and the interface 506.

In this way, the express communication signals bypass the processing modules 900 of the processing nodes 500 until the express communication signals are received by a processing node 500 for which the communication signals are "non-express" such as the destination processing node, for example. This reduces delay in routing the express communication signals, since less processing is performed and thus, network congestion is reduced.

Figure 7:
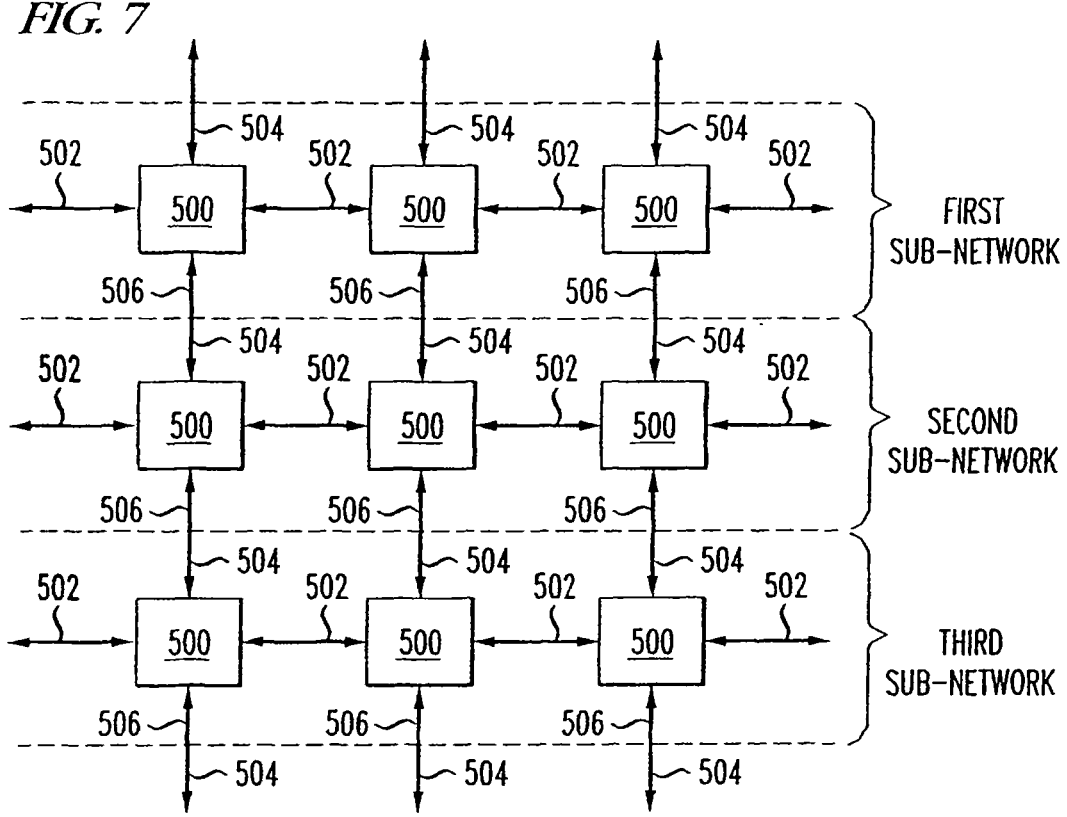
FIG. 7 is an exemplary diagram of a plurality of processing nodes organized into sub-networks.

FIG. 7 is a block diagram showing the three exemplary groupings of the processing nodes 500. As shown in FIG. 7, the processing nodes 500 are organized into three sub-networks. Each of the processing nodes 500 may be linked directly or indirectly to one or more processing node 500 in an above sub-network, one or more below sub-network or below device, and other processing nodes 500 in the same sub-network, if there are more than one processing node in the same sub-network, via interfaces 502, 504 and 506, respectively. When processing non-express communication signals, each processing node 500 only needs to determine if the non-express communication signal is to be routed to a processing node in an above sub-network, a below sub-network or below device, or other processing nodes of the same sub-network. Thus, only local processing of non-express communication signals is performed.

Figure 8:
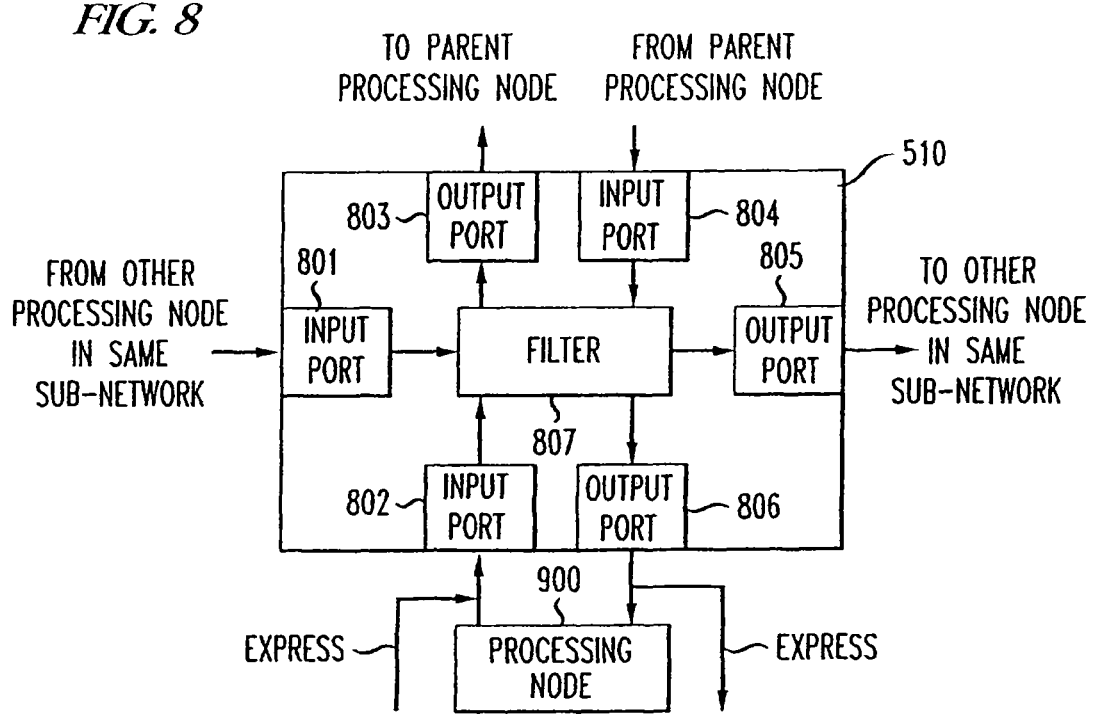
FIG. 8 is an exemplary diagram of the medium interface of the processing node of FIGS. 5 and 6.

FIG. 8 is a more detailed-diagram of the medium interface 510. As shown in FIG. 8, the medium interface 510 includes input ports 801, 802 and 804 and output ports 803, 805 and 806. The input and output ports 801 and 805 form the interface 502; the input and output ports 804 and 803 form the interface 504; and the input and output ports 802 and 806 receive and output communication signals from and to the processing module 900, respectively.

While the input and output ports 801-806 of the medium interface 510 are shown as single ports, each of the ports 801-806 may comprise a plurality of ports depending on particular implementation details. Furthermore, the input and output ports 801-806 may be combined into single input/output ports or multiple input/output ports without departing from the spirit and scope of the present invention. Additional ports may be provided to support routing of express communication signals.

The medium interface receives communication signals in the form of modulated carrier signals. When a device initiates a communication, the first processing node 500 that receives communication data of the communication selects an appropriate carrier signal and modulates the selected carrier signal with the communication data. The modulated carrier signal is then routed through the network via the medium interface 510 of the first processing node 500. Express and non-express communication signals may be distinguished by allocating a group of carrier signals as express while other carrier signals may be non-express, for example.

The medium interface 510 includes a filter 807 that performs the routing function among the ports 801-806. If each of the output ports 803, 805 and 806 are assigned to specific carrier signals by frequency or wavelength groups, for example, then the filter 807 may separate the communication signals received via input ports 801, 802 and 804 by the carrier signal frequency/wavelength group and direct communication signals having appropriate carrier signals to the respective output ports 803, 805 and 806.

For example, Table 2 below shows an exemplary assignment of carrier signals based on non-express carrier signal frequencies.

TABLE 2

Example of Carrier Signal Assignment

| Group | Carrier Frequency | From Input Port | To Output Port |
|---|---|---|---|
| 1 | $f_1$-$f_2$ | 801 | 805 |
| 2 | $f_3$-$f_4$ | 801 | 806 |
| 3 | $f_5$-$f_6$ | 802 | 803 |
| 4 | $f_7$-$f_8$ | 802 | 805 |
| 5 | $f_9$-$f_{10}$ | 804 | 805 |
| 6 | $f_{11}$-$f_{12}$ | 804 | 806 |

Thus, the filter 807 filters out carrier signals within frequency range: (1) $f_1$-$f_2$ of Group 1 received from input port 801 and directs them to output port 805; (2) $f_3$-$f_4$ of Group 2 received from input port 801 and directs them to output port 806; (3) $f_5$-$f_6$ of Group 3 received from input port 802 and directs them to output port 803; (4) $f_7$-$f_8$ of Group 4 received from input port 802 and directs them to output port 805; (5) $f_9$-$f_{10}$ of Group 5 received from input port 804 and directs them to output port 805; (6) $f_{11}$-$f_{12}$ of Group 6 received from input port 804 and directs them to output port 806. While the above example shows frequency ranges, various selections of carrier frequencies may be grouped together and treated as a range.

Optical frequencies/wavelengths may be viewed as light colors. For example, Table 3 shows and exemplary carrier signal color assignment of groups 1-6.

TABLE 3

Example of Carrier Signal Color Assignment

| Group | Carrier Color | From Input Port | To Output Port |
|---|---|---|---|
| 1 | Blue | 801 | 805 |
| 2 | Yellow | 801 | 806 |
| 3 | Green | 802 | 803 |
| 4 | Brown | 802 | 805 |
| 5 | Red | 804 | 805 |
| 6 | Purple | 804 | 806 |

Additionally, certain frequencies/wavelengths may be predetermined to be "express" frequencies/wavelengths. For example, if the carrier signal is of a frequency/wavelength not assigned to the processing node 500 for processing, and the frequency/wavelength is designated an express frequency/wavelength, the corresponding carrier signal is routed to an appropriate output port. The express frequencies or wavelengths are handled by the medium interface 510 in the same manner as communication signals having non-express frequencies/wavelengths. Furthermore, additional ports may be added that are pre-defined for receiving express frequency/wavelength communication signals from the filter 807. In such a case, the filter 807 will route communication signals having these express frequencies and wavelengths to the pre-defined ports.

When RF frequencies are used, the filter 807 may include band pass, low pass and high pass filters as is well known in the art. When optical frequencies or wavelengths are used, dichroic mirrors, prisms, grading filters and other types of optical filters and optical switches may be used as is well known in the art. Thus, direct routing of carrier signals among the input/output ports 801-806 may be accomplished by known devices that may not require computational power. Such direct routing significantly reduces computational loads of the processing module 900 of each processing node 500 for routing network traffic.

In particular, "global" routing may be accomplished by the medium interface 510 together with frequency/wavelength assignments and the sub-network organization while "local" routing may be performed by the processing module 900. In other words, "global" routing may be performed without having to process address information of the communication signals. "Global" routing may be performed by frequency/wavelength assignments and the particular configuration of the filters in the medium interfaces 510 of the processing nodes 500. If a medium interface 510 of a processing node 500 determines, through filtering of the communication signals, that the communication signal is to be processed by the processing node 500, "local" routing is performed on the address information of the communication signal by the processing module 900, as described in more detail hereafter.

When communication signals (or traffic), that are received from the interface 506, are destined to processing nodes 500 or user devices (e.g., telephone stations or terminals, not shown) that are reachable only via an above sub-network, the communication data is modulated by the processing module 900 onto a carrier signal that has a frequency/wavelength that is assigned to an above sub-network processing node 500. The modulated carrier signal is then sent to the above sub-network processing node 500 via the input port 802, the filter 807 and the output port 803.

Non-express traffic received through the interface 506, destined for another processing node 500 of the same sub-network, are modulated onto a carrier signal having a frequency/wavelength assigned to a same sub-network processing node 500. The modulated carrier signal is then sent to the same sub-network processing node 500 via the input port 802, the filter 807 and the output port 805.

Namely, each processing node 500 is assigned a specific carrier frequency/wavelength or frequency/wavelength range. By use of the medium interface 510, the processing module 900 is assured that only traffic that it must process is received and thus, processing associated with "pass through" or "express" traffic that are destined elsewhere, is avoided. In this way, traffic routing may be reduced to only local considerations because "global" routing issues are resolved by the medium interface 510, the carrier signal frequency/wavelength assignments and the sub-network organization. The above three architectural elements (the medium interface 510, sub-network organization, and frequency assignment) can be predetermined and do not require "real-time" computations. Thus, the processing nodes 500 provide for significant network efficiency improvement by reducing processing node computational power requirements and by reducing network congestion.

When communication signals are received from user devices or processing nodes 500 in a below sub-network that do not have an express frequency/wavelength carrier signals, through input/output interface 520, for example, the processing module 900 demodulates the carrier signals to extract the communication data. Processing is then performed on the extracted communication data to determine local routing of the communication signals, as described hereinafter. Based on the results of the processing, the processing module 900 sends a modulated carrier signal, i.e. communication signal, to the medium interface 510 via input port 802, having the appropriate frequency/wavelength for routing by the medium interface 510. Alternatively, if carrier signals are received from user devices or processing nodes 500 in a below sub-network and the carrier signals have an express frequency or wavelength, the carrier signals, and hence the communication signals, are routed by the medium interface 510 without processing by the processing section 580 and processing module 900.

While FIG. 8 shows that all communication signals received through any of the input ports 801, 802 and 804, are passed through the filter 807, not all communication signals nee(l be passed through the filter 807. Direct communication links may be provided, for example, between input port 804 and output port 806. For example, if every below sub-network processing node 500 only receives communication signals that are destined for below sub-networks or below devices, all communication signals received through input port 804 are passed directly to output port 806. Similarly, direct connections may be utilized for passing express communication signals from input ports to appropriate output ports.

Figure 9:
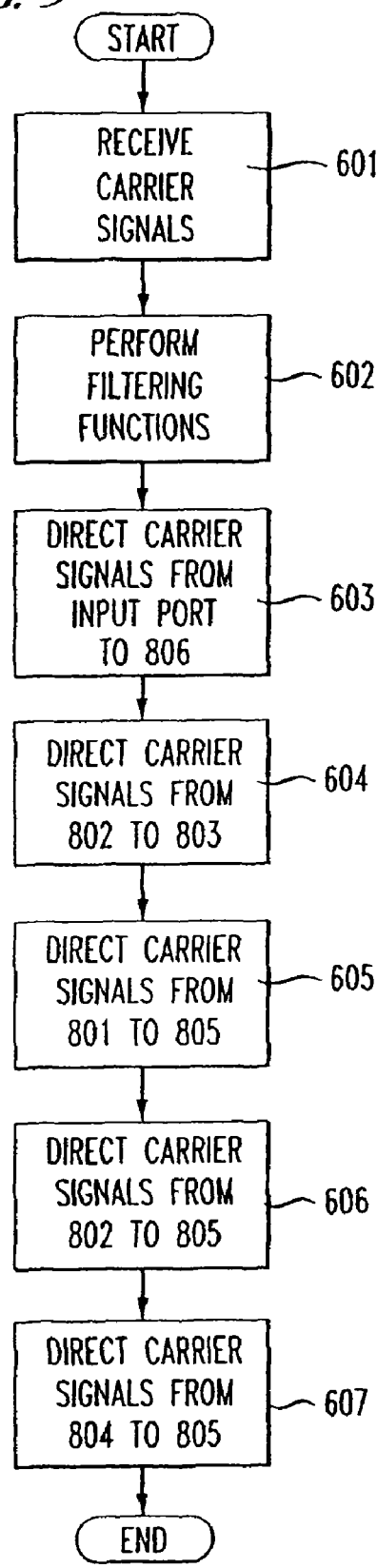
FIG. 9 is a flowchart outlining an exemplary operation of the medium interface of FIG. 8.

FIG. 9 shows an exemplary flowchart of the operation of the medium interface 510. In step 601, modulated carrier signals, i.e. communication signals, are received by the medium interface 510 through at least one of the input ports 801, 802 and 804, and the medium interface 510 goes to step 602. In step 602, the medium interface 510 performs the filtering function described above to separate the modulated carrier signals into groups such as shown in Tables 1, 2 or 3, and goes to step 603.

In step 603, the medium interface 510 directs group 6 modulated carrier signals received through port 804, i.e. the modulated carrier signals from an above sub-network, and group 2 modulated carrier signals received from input port 801 to output port 806. In step 604, the medium interface 510 directs group 3 modulated carrier signals received through port 802, i.e. the modulated carrier signals from the processing module 900, to the output port 803.

In step 605, the medium interface 510 directs group 1 modulated carrier signals from input port 801 to the output port 805. In step 606 the medium interface 510 directs group 4 modulated carrier signals from input port 802 to the output port 805. In step 607, the medium interface 510 directs group 5 modulated carrier signals from input port 804 to output port 805. Although not explicitly shown in FIG. 9, similar functions may be performed for the express frequencies/wavelengths, such as those shown in Table 3. The above steps maybe performed in any order and may be performed in parallel as well as serially.

The medium interface 510 may continue the above process even if the processing module 900 becomes inoperative because the functions of the medium interface 510 may be independent of the functions performed by the processing module 900. For example, if the medium interface 510 is comprised of optical elements, then the modulated carrier signals are modulated light signals and the various colors of light may be directed to appropriate output ports 803, 805 and 806 as long as the optical elements are functioning. If the optical elements are passive elements, then the medium interface 510 continues to operate even during electric power outages. Thus, the medium interface 510 may be a reliable coupling element in the network 500 allowing the network 500 to function independent of the state of the processing module 900.

The functions of the medium interface 510 described above, may be performed by elements such as passive or active filters, or digital computational elements such as a dedicated processing elements, e.g., digital filters using application specific integrated circuits (ASICs) or PLAs, etc., or general purpose processors as implementation details dictate. That is to say that computational elements may be used in the medium interface 510, if desired, but non-computational elements may also be used to achieve—the functions of the medium interface 510.

Figure 10:
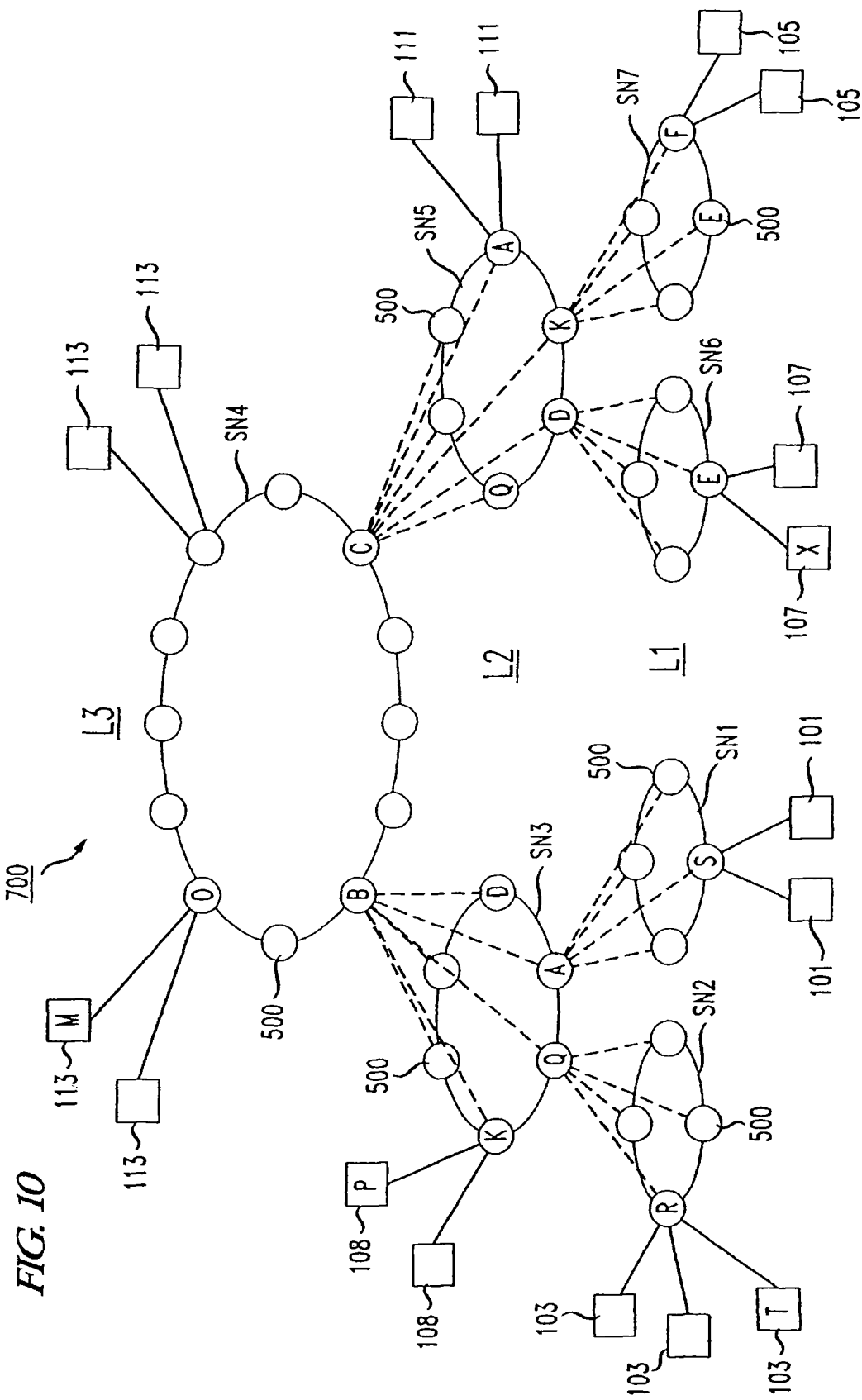
FIG. 10 is an exemplary diagram of a network system that includes the processing node of FIGS. 5 and 6.

FIG. 10 shows one embodiment where the sub-networks are organized hierarchically into layers L1, L2 and L3. The network 700 is partitioned into a plurality of sub-networks SN1-SN7 where SN1, SN2, SN6 and SN7 are in layer L1, SN3 and SN5 are in layer L2 and SN4 is in layer L3. The sub-networks SN1, SN2, SN6 and SN7 of layer L1 are below the sub-networks SN3 and SN5 of layer L2. The sub-networks SN3 and SN5 or layer L2 are below the sub-network SN4 of layer L3.

The processing nodes 500 of each of the sub-networks SN1-SN2 and SN6-SN7 are coupled to one processing node 500 of an above sub-network SN3 or SN5. A processing node 500 that is in an above sub-network SN3 or SN5 is referred to as a parent processing node 500 to the processing nodes 500 that are in a below sub-network and coupled directly to it. Processing nodes 500 that are in a below sub-network that is directly coupled to a processing node 500 are referred to as child processing nodes of that processing node 500 and user devices that are below a processing node 500 are also referred to as child devices of that processing node 500. A processing node 500 that receives a communication signal for routing via its medium interface 510 or for processing via its processing module 900 is referred to as the current processing node.

For example, the sub-network SNI has a parent processing node 500 designated by the letter "A." Likewise, sub-network SN3 has a parent processing node 500 designated by the letter "B." Each processing node in the second and third layers L2 and L3, respectively, may be a parent processing node 500 of a sub-network: SN1-SN2 and SN6-SN7 in lower layer L1. User devices 101-113 may be children of the processing nodes 500 of any of the layers L1-L3.

FIG. 10 is only exemplary and various modifications to the particular network architecture may be made without departing from the spirit and scope of the present invention. For example, while FIG. 10 shows the processing nodes 500 of below sub-networks communicating with a single above processing node 500, the invention is not limited to such an arrangement. Each processing node 500 may communicate with one or more above or below sub-network processing nodes 500. Furthermore, the sub-networks are not limited to a circular architecture as shown in FIG. 10. The sub-networks may be organized serially or in a broken star fashion, for example. Other modifications as will become apparent to those of ordinary skill in the art are intended to be within the scope of the present invention.

As shown in FIG. 10, a plurality of user devices 101-113 communicate with one another over the network 700. Each processing node 500 in the network 700 may serve as an access provider for one or more of the user devices 101-113. The user devices 101-113 may communicate with each other by entering the destination address of other user devices 101-113, such as the telephone number, IP address, electronic mail address, and the like. For example, If one of the user devices 101 desires to communicate with one of the user devices 105, an operator of the user device 101 may—enter the destination address for the user device 105 through a user interface, such as a keypad, touch-screen, voice recognition device, and the like. The communication signals are routed from the user device 101 through the network 700 traversing a path, for example, as follows:

(1) user device 101 to processing node "S" of SN1;
(2) processing node "S" to processing node "A" of SN3;
(3) processing node "A" to processing node "B" of SN4;
(4) processing node "B" to processing node "C" of SN4;
(5) processing node "C" to processing node "K" of SN5;
(6) processing node "K" to processing node "F" of SN7; and finally
(7) processing node "F" to the destination user device 105.

The user devices 101-113 may be any device that transmits and/or receives signals. For example, the user devices 101-113 may be land-line telephones, cellular telephones, computers, personal digital assistants, point of sale devices, two-way pagers, WebTV™, and the like. For simplicity of discussion, the following description will assume that the user devices 101-113 are land-line telephones.

The user devices 101-113 are in communication with the network 700 over communications links. These communications links may be any type of connection that allows the transmission of information. Some examples include conventional telephone lines, fiber optic lines, direct serial connection, wireless communication links, satellite communication links, and the like. The processing nodes 500 of the network 700 may also be linked by similar communication links.

The communication signals may include communication data and address information. The communication data and address information are modulated onto the carrier signals which are "steered" through the network 700 via the medium interfaces 501 of the processing nodes 500.

When a child device initiates a communication with another child device by, for example, entering a destination address of the other child device and sending a transmit command, a communication signal from the child device to a first processing node 500 in the network 700 is sent. The communication signal from the child device may include such information as the calling child device identifier, a destination address, and the like. Based on the destination address, or an address generated from the destination address the first processing node 500 determines whether to send the communication signal to another node in a same sub-network, a node in an above sub-network, or a node or child device in a below sub-network.

The destination address may be an identifier that indicates the routing necessary for the communication signal or may be an identifier of a child device from which routing address information is determined. Routing address information may be determined from the destination address by, for example, using a look-up table or the like, in the processing nodes 500. For simplicity of the following description, it will be assumed that the destination address indicates the routing necessary for the communication signal.

Similarly, whether or not the communication signal is an express communication signal may be determined from the calling child device address, destination address, a look-up table or the like. Various criteria, such as network congestion, the type of call (which may be determined from the destination address, for example), and the like may be taken into consideration when determining if a communication signal is an "express" communication signal. Each processing node 500 of the network 700 may be capable of determining if a received non-express communication signal should be made "express" by use of a look-up table or the like. Thus, a communication signal may not be "express" in one portion of the network 700 and may be determined to be "express" in another portion of the network 700.

When a processing node 500 receives a communication signal from a child (either a child processing node or a child device) that does not have an express frequency/wavelength, via the interface 506, the processing module 900 examines the destination address to determine whether the destination device is another child, a child of another processing node 500 of the same sub-network SN1-SN7 or a child of some other processing node 500. If the destination device is not another child, the processing module 900 selects the appropriate carrier signal frequency/wavelength and modulates the selected carrier signal with the communication signal and transmits the modulated carrier signal onto the communication medium via port 802 of the medium interface.

If the destination address includes an address of a child processing node 500, then the processing module 900 modulates the communication data onto a carrier signal that corresponds to the destination processing node 500 and outputs the modulated carrier signal to the medium interface 510 of the child processing node via the interface 506. If the destination device is a child device, then the processing module 900 processes the communication signal for output to the child device in a manner that is known in the art and delivers the processed signal to the child device.

In the processes described above, each processing module 900 is not required to determine a routing path for the communication signal, but only needs to distinguish based on the destination address, whether the destination device is reachable through an above, same or a below sub-network SN1-SN7/processing node 500. Thus, the amount of processing required of each processing module 900 is greatly reduced when compared to that required by conventional routers and switches.

If the communication signal from the child device or below sub-network has a frequency/wavelength that is predetermined to be an express frequency/wavelength, the processing nodes 500 pass the communication signal, by way of the medium interfaces 510, until the processing node to which the express frequency/wavelength is assigned receives the communication signal. For example, if processing node C in layer L3 of FIG. 10 is assigned an express frequency of $f_{13}$ and child device T generates a communication signal having frequency $f_{13}$, the communication signal will be passed without processing through the medium interfaces of processing nodes R, Q, B and through the medium interfaces 510 of the processing nodes 500 in the sub-network SN4 to the processing node C. When the processing node C receives the communication signal, its medium interface 510 recognizes, through filtering of the communication signal, that the communication signal is to be processed by its processing module 900. The processing node C therefore, performs "local" processing on the address information of the communication signal to determine how to route the communication signal.

Figure 11:
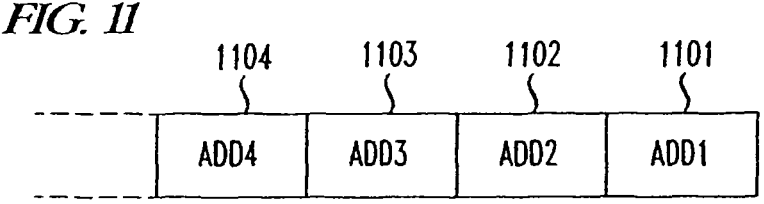
FIG. 11 is an exemplary diagram of address information.
Figure 12:
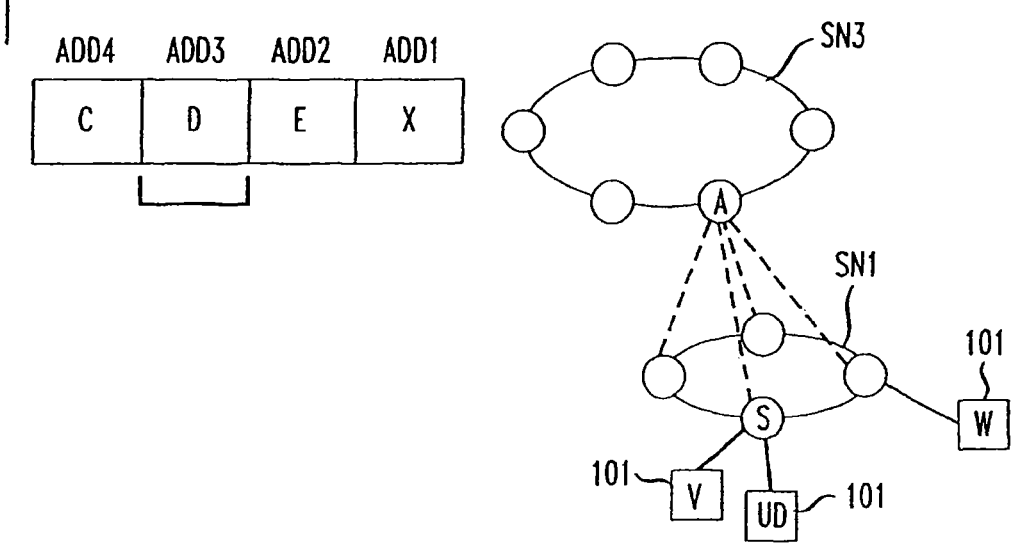
FIGS. 12-17 are exemplary diagrams illustrating an addressing scheme and how the addressing scheme is used to route communication signals through the network of FIG. 10 using local processing according to this invention.

Further efficiency is obtained by partitioning the address information in a manner that corresponds to the sub-network organization. For example, if the address is partitioned as shown in FIG. 11, into address fields 1101-1104, then each field of the address corresponds to a layer L1-L3 of the network and one field of the address maybe used to address child devices. In this way, the determination of whether the destination device is reachable through an above, same or below sub-network SN1-SN7 or processing node 500 may be accomplished by examining either the entire portion of the address above the level of the current processing node 500 or by examining the address immediately above the level of the current processing node 500.

Returning to FIG. 10, when a user of one of the user devices 101 wishes to communicate with one of the user devices 107, for example, the user activates (goes off-hook, for example) the user device 101 and enters the destination address information, such as a telephone number, IP address, access number, or the like as is well known in the art. The communication signals containing the address information are sent to the processing node S in the sub-network SN1 of layer L1. The processing node S examines the fields of the destination address information to first determine if the parent processing node A is addressed. If so, then the destination device is a child of one of the processing nodes 500 of the same sub-network SN1.

In this case, the processing node S further examines the destination address to determine whether the destination device is a child of the processing node S or of another processing node of the same sub-network SNI. If a child of the processing node S, the communication signal is processed and sent to the child device 101. If the destination device is a child of another processing node of the same sub-network SN1, then the processing node S modulates the communication signal onto a carrier signal assigned to the other processing node 500 and transmits the carrier signal via the port 805 of the medium interface 510.

The same process as described above is performed by each of the processing nodes A, B and C, assuming the carrier signal does not have an express frequency/wavelength assigned to it. Processing nodes D and E need not determined if their respective parent processing nodes are addressed or if they themselves are addressed since the communication signals are sent to them from their parent processing nodes.

Thus, processing nodes D and E need only determine which below sub-network processing node 500 or child device to route the communication signals.

If the parent node A is not addressed, then the destination device is only reachable via the above sub-network SN3, and thus, the communication signal is modulated onto a carrier signal whose frequency/wavelength is allocated to the processing node A of the above sub-network SN3. The modulated carrier signal is transmitted to the processing node A via the port 803 of the medium interface 510.

The address information of the communication signals is organized in a manner corresponding to the sub-network organization. Each portion of the address information shown in FIG. 11 corresponds to each of the layers of sub-networks in the network 700. For the network 700 shown in FIG. 10, the address information may contain four fields 1101, 1102, 1103 and 1104 corresponding to addresses ADD1, ADD2, ADD3 and ADD4, respectively. ADD1 identifies a particular user device, ADD2 identifies the first layer sub-network processing node, ADD3 identifies a second layer sub-network processing node and ADD4 identifies a third layer sub-network processing node.

Each of the addresses ADD1-ADD4 contains sufficient information to uniquely identify each processing node 500 of the sub-networks SN1-SN7 within the respective layers L1-L3. ADD1 includes enough bits to identify the particular user devices 101-113 connected to the processing nodes in layer L1; ADD2 includes enough bits to address every processing node within one sub-network SN1, SN2, SN6 and SN7 of layer L1; ADD3 includes enough bits to address every processing node within one sub-network SN3 or SN5 of layer L2; and ADD4 includes enough bits to address every processing node within one sub-network SN4 of layer L3.

The addresses ADD1, ADD2, ADD3 and ADD4 may be shared for sub-networks SN1-SN7 within the same layer because the network 700 is organized into layers such that the sub-networks SN1-SN7 in each layer L1-L3 are separated, in a path traversal sense, from other sub-networks in the same layer L1-L3 by at least one processing node 500 of an upper layer. For example, the address ADD1 may be the same for the user device 101 and the user device 107 since addresses ADD2, ADD3 and ADD4 designate a unique communication "pathway" between the associated processing nodes. Similarly, ADD2 may correspond to a processing node 500 in sub-networks SN1 and SN6.

However, if address processing is based on examining the entire address above the current processing node 500 level, only a difference in the highest level address is necessary to designate a unique address for the destination user device. For example, if a user device whose parent node is processing node A in sub-network SN3 of FIG. 10 wishes to communicate with a user device 111, because there is a difference in the address for the processing node in sub-network SN4, the communication signals will be properly routed. That is, the address for communication signals from processing node A in sub-network SN3 to user device 111 is CA. The address for communication signals from user device 111 to processing node A in sub-network SN3 is BA. If both the processing nodes 500 in sub-networks SN3 and SN5 had the same parent processing node 500, communication signals will only be routed to below processing nodes 500.

Furthermore, the communication signals will be routed up the levels L1-L3 of the network 700 until a same entire above address is encountered. At this point, the communication signals will be routed back down the levels of the network 700. Thus, for example, if an address for a destination user device is CABQ and an address for the originating user device is CALH, when the communication signal is processed by a processing node 500 in level L2, the above address "CA" designates the parent processing node of the level L2 sub-network. Accordingly, the communication signal may not be routed further up the levels of the network 700 and the communication signal may be routed back down the network 700 levels, if possible.

If address processing is based on examining the immediate above address, each above address at each level must be different from other above addresses for processing nodes 500 at the same level having the same address. Thus, processing node A in sub-network SN5 cannot have a below sub-network processing node with the address S since communication signals from user devices 101 would not be able to be routed to user devices connected to the processing node S. That is to say, the address for communicating with the user devices would be CAS, however, when the processing node S examines the immediate above processing node address it will appear as if the above processing node address corresponds to the parent processing node of processing node S in sub-network SN1. Thus, communication signals will be routed to below processing nodes.

Communication signals that do not have an express frequency/wavelength may be routed through the network 700 using the addresses ADD4-ADD1 as explained below in connection with FIGS. 12-17. When the user device 101 (a child of processing node S) initiates a call to the user device 107 (a child of processing node E), processing node S first receives the carrier signal from the user device 101 via the interface 506. The input/output interface 520 extracts the communication signal and provides the address information to the processing module 900. The processing module 900 processes the address information to determine where to send the communication by analyzing the addresses ADD4-ADD1. For this example, ADD4-ADD1 have the values C, D, E—and X corresponding to addresses of processing nodes C, D, E and user device X, as shown in FIG. 10.

As mentioned above, routing of communication signals may be based on the entire above address or may be based only on the immediate above address. The entire above address approach involves examining the entire address above a current level of the system architecture. The immediate above address approach involves examining the address associated with the level immediately above a current level in the system architecture. For purposes of the following description, the immediate above address approach will be assumed. The entire above address approach will be described hereinafter.

The processing module 900 of the processing node S determines from the above address ADD3 whether the address identifies the parent processing node A in the above sub-network SN3. If the address ADD3 identifies the parent processing node A in the above sub-network SN3, then the communication is destined for a user device 101 that is a child of one of the processing nodes 500 in the same sub-network SN1 because, the address for all processing nodes 500 within the sub-network SN1 has the same value for ADD3. However, in this example, the destination address is for the user device 107, thus ADD3 identifies processing node D in sub-network SN5. Thus, the processing module 900 modulates the communication data onto a carrier signal having a frequency or wavelength that is assigned to parent node A and transmits the modulated carrier signal via port 803 of the medium interface 510.

When the processing node A receives the modulated carrier signal via its interface 506, the address information is extracted and is processed. The processing module 900 of the processing node A determines whether the address of its parent node B is part of the address information. Thus, the processing module 900 examines ADD4, because the processing node A is in layer L2 and all layer L2 sub-networks SN3 and SN5 have parents in the above sub-networks in layer L3 and the address of processing nodes 500 in layer L3 is ADD4.

Figure 13:
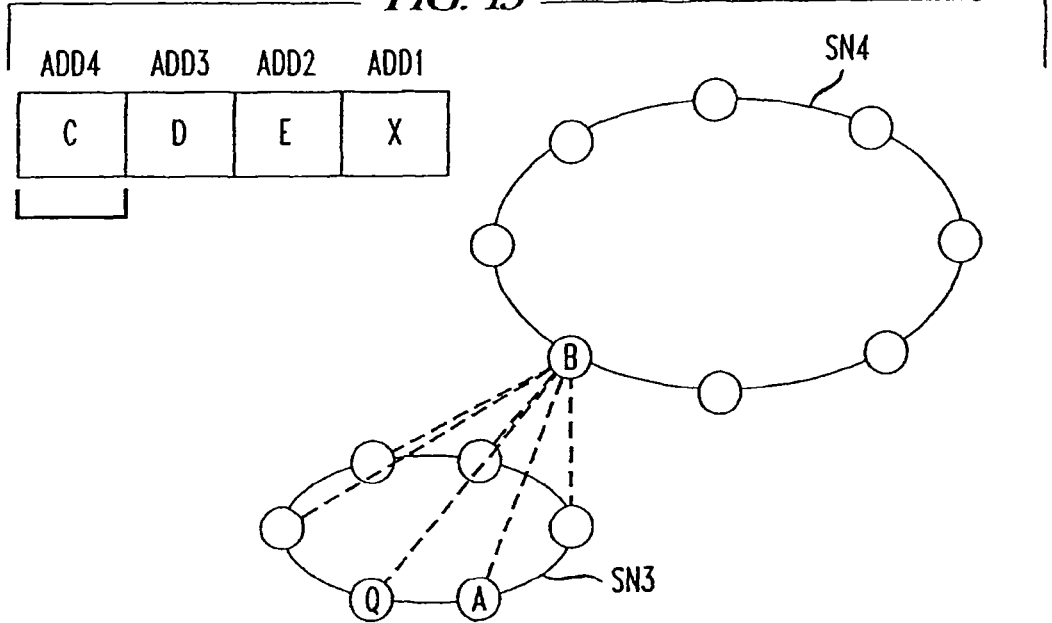

In this example, ADD4 has a value that is the address of processing node C, thus ADD4 is not the address of processing node B. As shown in FIG. 13, for this example, a modulated carrier signal is generated and sent to the parent processing node B through port 803. The processing module of processing node B demodulates the carrier signal and processes the address ADD4 of the communication data to determine to which processing node 500 in the sub-network SN4 of the layer L3 to send the communication signal. Since the sub-network SN4 is in the top layer L3 of the network 500, there is no layer above it and the address ADD4 corresponds to the address for a processing node 500 in the sub-network SN4 of layer 13. In the present example, a modulated carrier signal is generated and sent to processing node C in sub-network SN4. The modulated carrier signal is passed through the medium interfaces 510 of all intervening processing nodes 500 without processing until the modulated carrier signal is received by the processing node C.

Figure 14:
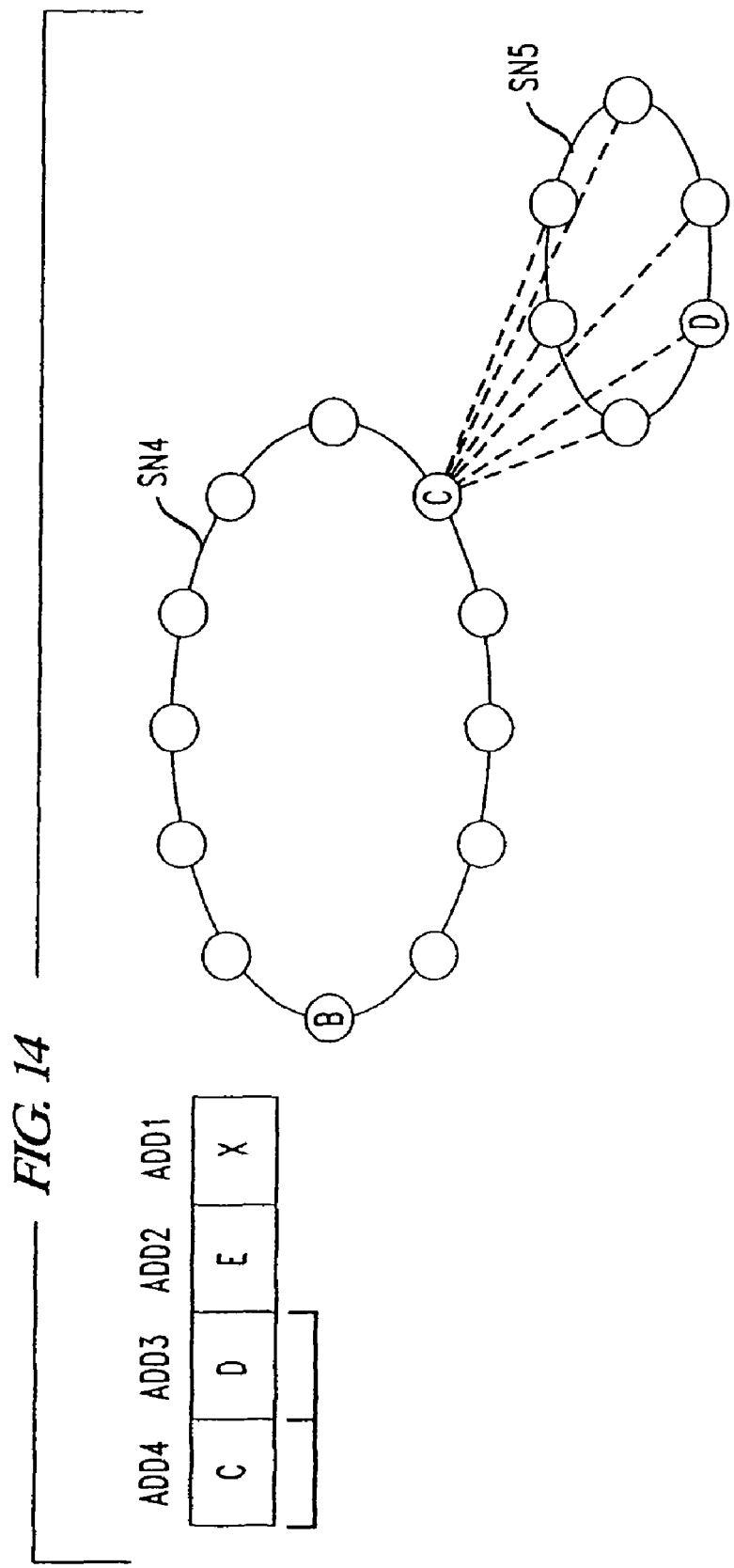

When processing node C receives the carrier signal, as shown in FIG. 14, the carrier signals are passed by the filter 807 of the medium interface 510 to the port 806 and hence, to the processing module 900 of processing node C. The processing node C then reads the address ADD3, determines that it corresponds to an address for processing node D, and generates a modulated carrier signal having a frequency/wavelength assigned to processing node D. The modulated carrier signal is transmitted to the processing node D via the input/output interface 520 and the interface 506.

Figure 15:
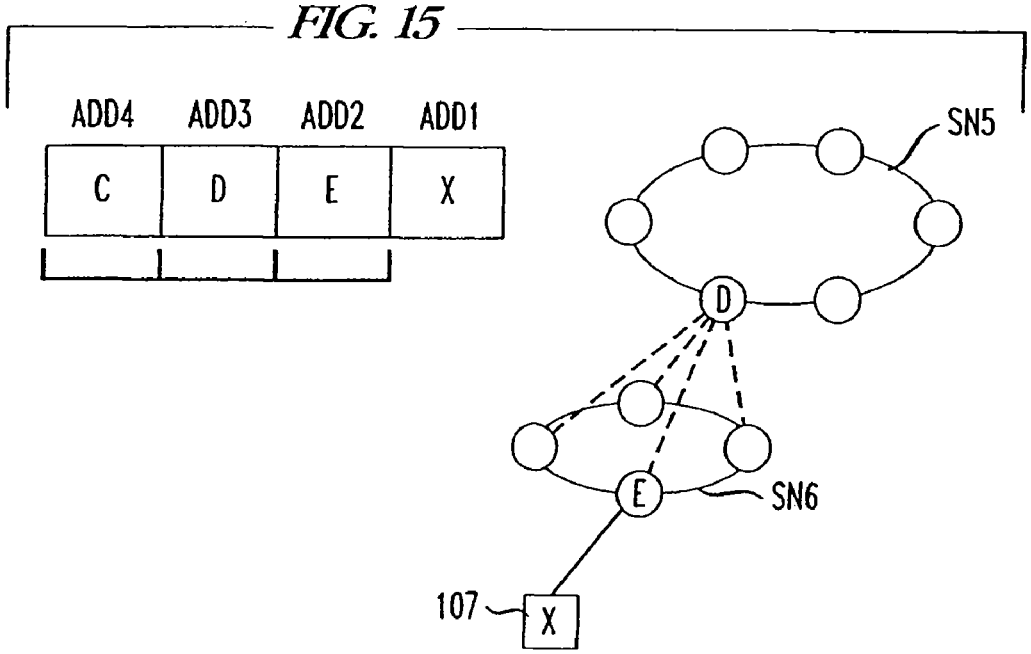
Figure 16:
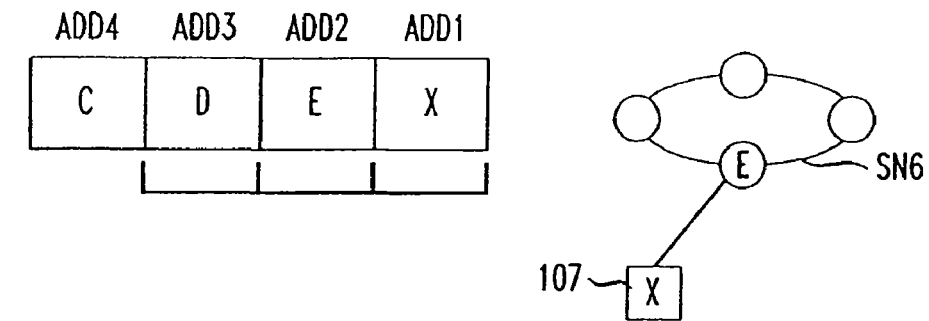

Processing node D receives the modulated carrier signal via the interface 504 and input port 804. The medium interface outputs the modulated carrier signal via output port 806 to the processing module 900 of processing node D. The processing module 900 performs processing on the received carrier signal, as shown in FIG. 15. The processing module of the processing node D reads address information ADD2, determines that it corresponds to the processing node E and generates a modulated carrier signal and sends the modulated carrier signal through the input/output interface 520 and the interface 506 to route the communication signal to the processing node E. As shown in FIG. 16, the processing node E reads address ADD1, determines that the address corresponds to a user device X, and outputs the communication signals to the user device X. It should be noted that when a processing node 500 receives a communication signal from an above sub-network processing node 500, the communication signal has already been determined to be one that is to be processed by the receiving processing node 500. Thus, the receiving processing node 500 of a communication signal from an above sub-network need not read its own address field but only needs to read the address for the below sub-network processing node or child device.

Figure 17:
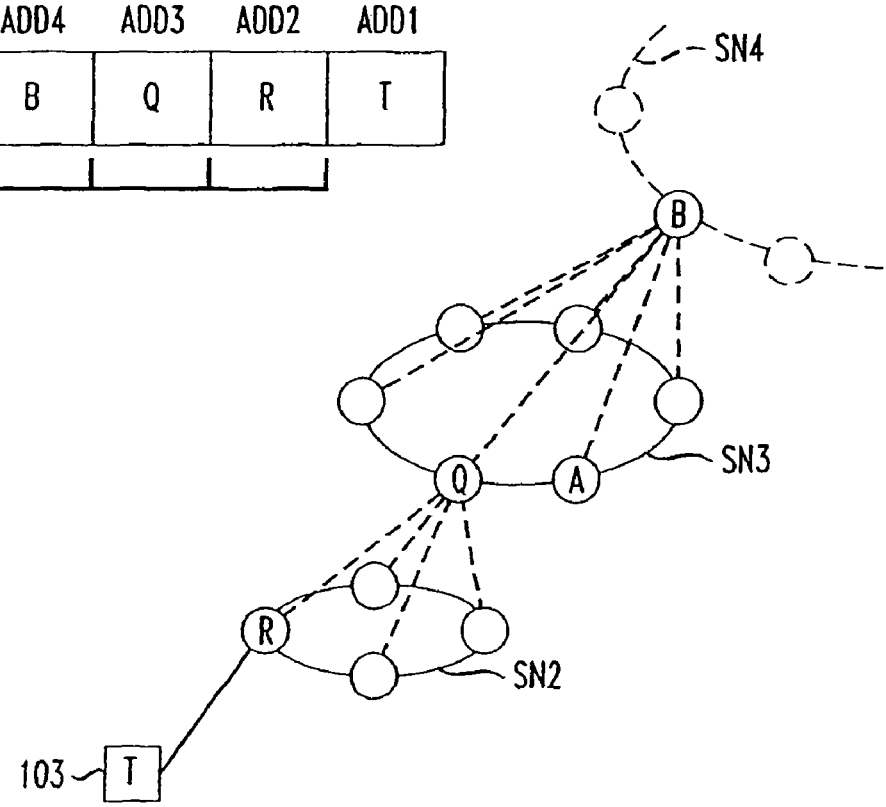

If the user device 101 called a user device 103, then when the processing node A receives a modulated carrier signal having address ADD4 which corresponds to an address for the parent processing node B in the sub-network SN4, as shown in FIG. 17, the processing module 900 of the processing node A determines that the carrier signal is destined for another processing node in the same sub-network SN3. The processing module 900 of the processing node A processes the address ADD3 to determine to which processing node in the sub-network SN3 to route the communication signals. The processing module 900 then generates a modulated carrier signal having a frequency/wavelength assigned to the designated processing node 500, in this case processing node Q.

The processing module 900 of processing node Q then receives the modulated carrier signal, demodulates the carrier signal to obtain the address information, and processes the addresses. The processing module 900 then processes the address ADD2 to determine to which processing node 500 in sub-network SN2 of the lower layer L1 to route the communication signals. In this case, the processing node 500 in sub-network SN2 is the processing node R. The processing module 900 then generates a modulated carrier signal and sends the carrier signal to processing node R through port input/output interface 520.

The processing module 900 of processing node R then processes address ADD1 to determine to which user device to send the communication signal, in this case user device T. In this way, user device 101 may send communication signals to user device 103, for example.

If the user device 101 enters a destination address for the user device 109, a similar process as discussed above occurs except the destination address may not specify ADD2 because the user device 109 is coupled directly to processing node K. ADD2 may be set to a predetermined pattern such as all "1 s" for a "place holder," for example. Thus, destination addresses of communication signals that are destined to the user device 109 have address information of the form "B,K, . . . P." When ADD2 is determined to be ". . . ," the processing node K sends the communication signals to the user device 109. Similarly, if a communication signal is destined to the user device 113, the address information would have the form "O, . . . , . . . , M."

If a received communication signal has a frequency/wavelength that has been predetermined to be an express frequency/wavelength, the above address processing is only performed by the processing node 500 to which the express frequency/wavelength is assigned. Thus, as previously described, no processing is performed on the express communication signals until they are received by their intended processing node 500. The medium interfaces 510 of each of the processing nodes 500 of the network 700 pass the communication signals without processing until the communication signals are received by the designated processing node 500. Once the designated processing node 500 receives the communication signals, the designated processing node 500 performs similar address processing on the communication signals to determine how to route them to the appropriate child device.

As demonstrated by the above example, communication signals are routed by a combination of the operation of the medium interface 510 and local address processing by each of the processing nodes 500. Thus, each of the processing nodes 500 only need provide processing power for local addresses and thus, greater processing node efficiency is obtained.

Figure 18:
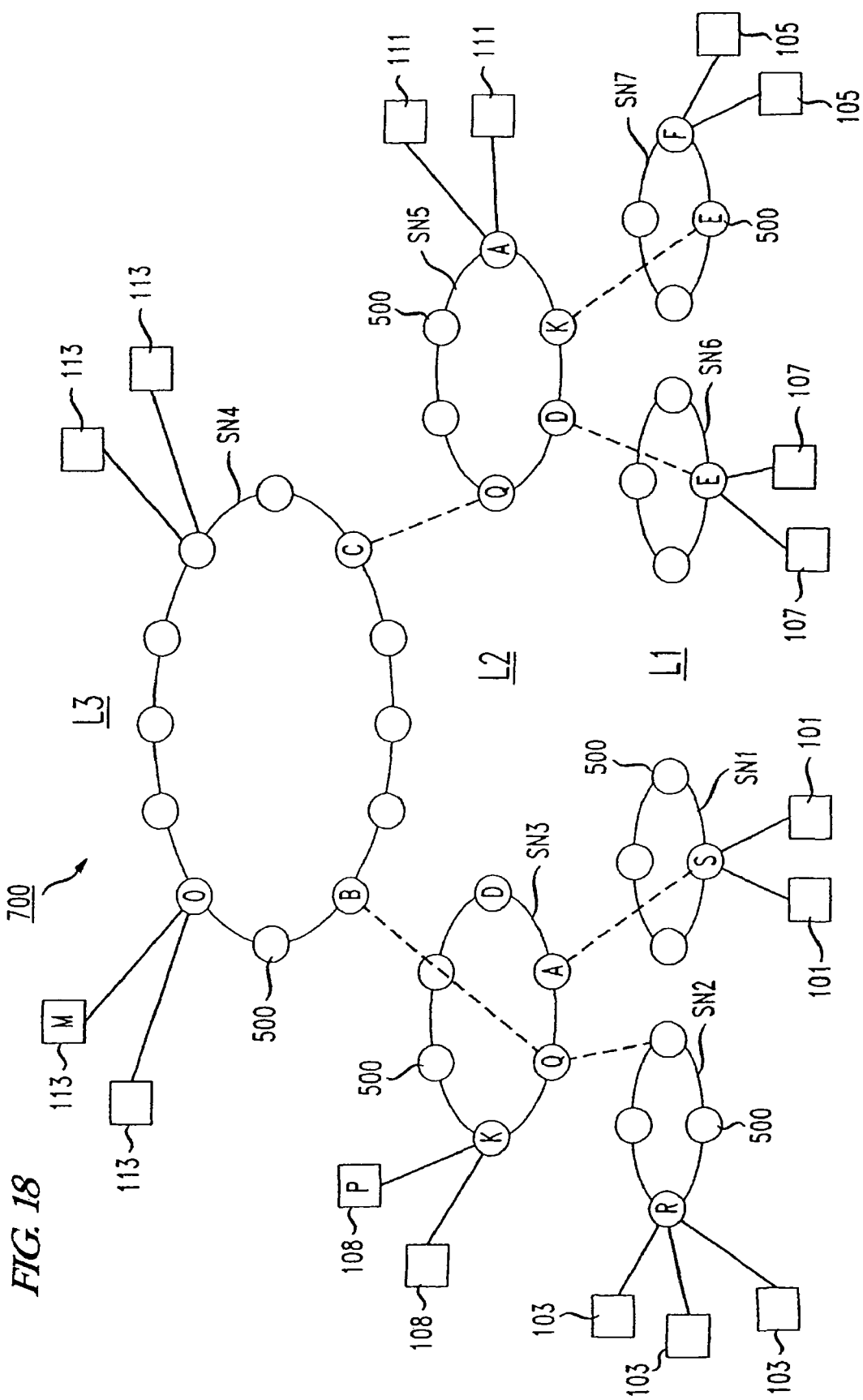
FIG. 18 is an exemplary diagram showing the allocation of wavelengths according to one embodiment of the present invention.

FIG. 18 shows another embodiment of the present invention. As shown in FIG. 18, each sub-network has designated linking processing nodes that link the sub-network to above and below sub-networks. With this architecture, when a processing node 500 in a sub-network requires that the communication be routed to a sub-network in an above or below layer, the processing node 500 generates and sends a modulated carrier signal having a frequency/wavelength assigned to the appropriate linking processing node. Once the linking processing node receives the modulated carrier signal, the carrier signal is demodulated and the address information is processed in a manner similar to that described above.

For example, in a case where user device 101 wishes to communicate with user device 107, the communication signals are routed:

(1) from processing node S to processing node A;
(2) from processing node A to processing node Q;
(3) from processing node Q to processing node B;
(4) from processing node B to processing node C;
(5) from processing node C to processing node Q;
(6) from processing node Q to processing node D;
(7) from processing node D to processing node E; and
(8) from processing node E to a user device 107.

Any of the above communication routing links 1-8 may be designated as "express" and processing by the processing modules 900 of the processing nodes 500 in the designated links may be bypassed.

While the above description assumes that the entire above address or each of the addresses ADD1, ADD2, ADD3 and ADD4 are processed without modification, processing these addresses may be performed before use, to correspond to network topologies more complex than shown in FIG. 10. For example, there may be more than one above sub-network corresponding to anyone sub-network so that communication signals have a plurality of possible communication pathways to traverse. Such an architecture would allow multiple communication pathways in the event that one or more pathways are congested.

Figure 19:
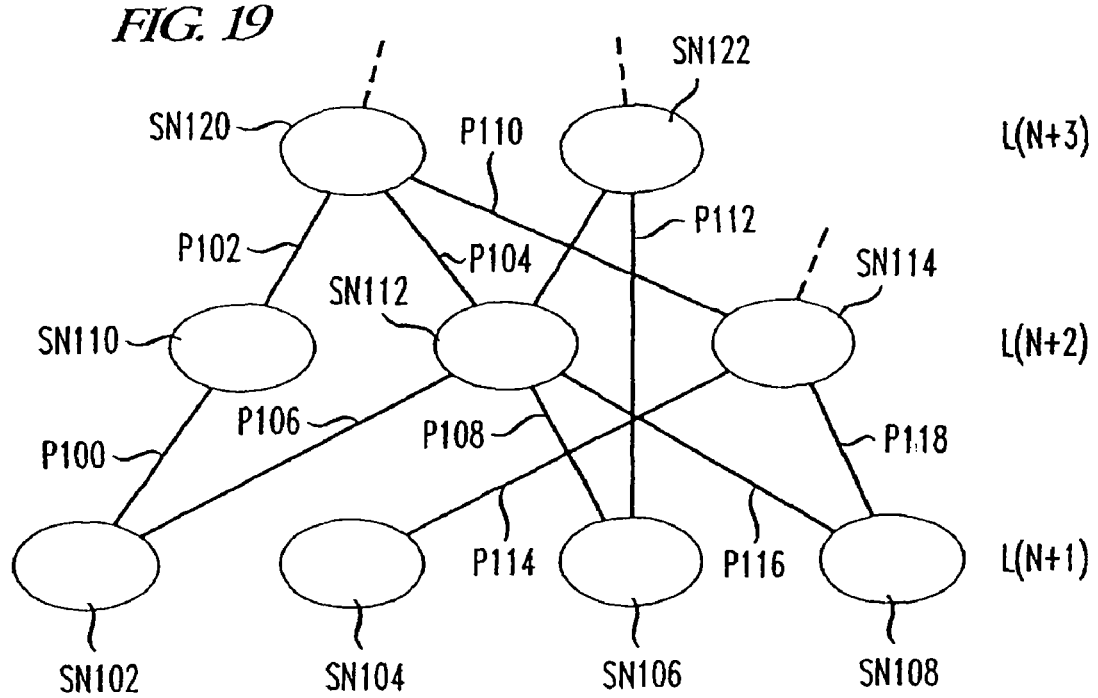
FIG. 19 is an exemplary diagram of a network architecture in which each sub-network is linked to two neighboring sub-networks.

FIG. 19 shows an example of a sub-network organization in which each below sub-network SN102, SN104, SN106 and SN108 has at least one above sub-network SN110, SN112 and SN114, and the sub-networks SN110, SN112 and SN114, likewise, may have more than one above sub-networks SN120 and SN122. In this example, below sub-network SN102 is associated with two above sub-networks SN110 and SN112, below sub-network SN104 is associated with above sub-network SN114, below sub-network: SN106 is associated with above sub-networks SN112 and SN122, and below sub-network SN108 is associated with above sub-networks SN112 and SN114. The below sub-network SN102 may send communication signals to either one of sub-networks SN110 or SN112 based on network conditions such as network congestion, for example. If the above sub-network SN112 is experiencing heavy traffic, the processing node 500 in the below sub-network SN102 may direct a greater amount of communication signals to the above sub-network SN110. In this way, load balancing of communication signal processing may be obtained.

As a specific example using the network organization of FIG. 19, consider a communication between a user device associated with a processing node 500 in the sub-network SN102 and a user device associated with a processing node SOO in the sub-network SN108. Normally, communication signals between these two user devices are routed from sub-network SN102 to above sub-network SN112 and then to below sub-network SN108 using communication pathways P106 and P116 because these are the shortest pathways, for example. However, if above sub-network SN112 is experiencing heavy traffic, the processing node 500 in sub-network SN102 may direct, through proper addressing and carrier signal frequency/wavelength assignment, the communication signals to above sub-network SN110, SN120, SN114 and SN108 via communication pathways P100, P102, P110 and P118, respectively.

Figure 20:
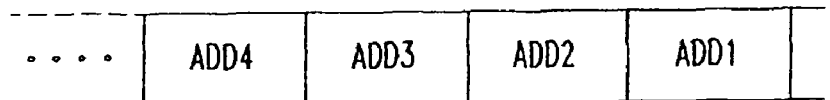
FIG. 20 shows the address fields that correspond to sub-network levels L(N), L(N+1), L(N+2) and L(N+3)

The address processing for the above example may be as follows. FIG. 20 shows the address fields that correspond to sub-network levels L(N), L(N+1), L(N+2) and L(N+3).

Figure 21:
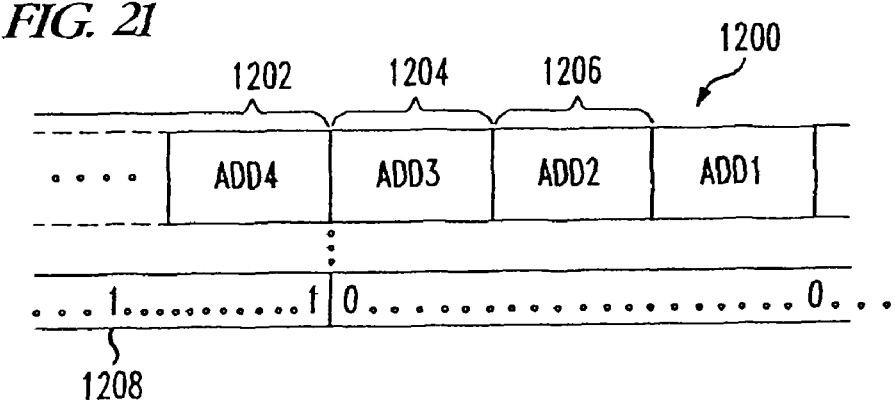
FIG. 21 shows a masking process of the address fields of FIG. 20.

ADD1 may correspond to an address of sub-networks that are in the level L(N) which are below the sub-networks SN102-SN108 of level L(N+1), ADD2 may correspond to an address of sub-networks SN102-SN108 which are below sub-networks SN110-SN114 of level L(N+2), ADD3 may correspond to an address of sub-networks SN110-SN114 which are below sub-networks of level L(N+3), and ADD4 may correspond to an address of sub-networks SN120-SN122 of level L(N+3). When sub-network SN102 receives communication signals from child devices, the processing module of SN102 first applies a masking process to the destination address 1200 as shown in FIG. 21. The masking allows the entire above address to be examined to determine proper routing of the communication signals rather than just the immediate above address.

The destination address is divided into three portions 1202, 1204 and 1206. The first portion 1202 includes addresses of all levels of above sub-networks that are above the sub-network SN102; the second portion 1204 is the address ADD3 and the third portion is the address ADD2. Thus, the first address portion 1202 is obtained by masking the destination address 1200 with a mask 1208 that includes all "1s" starting with a leftmost address bit down to and including ADD4 and "0s" elsewhere. Once the first address portion 1202 is obtain, the process module 900 of the sub-network SN102 searches a database 1220, shown in FIG. 22, for an entry that matches the first address-portion 1202.

The database 1220 includes all valid first portion addresses where each valid first portion address corresponds to an entry 1222-1226. Each of the entries 1222-1226 includes fields 1230-1234. The field 1230 identifies the valid first portion address 1-M where M is an integer and fields 1232-1234 may indicate information relating each of the valid first portion addresses 1222-1226. For example, the field 1232 may indicate the congestion level, and the field 1234 may indicate an operational status of each of the valid first portion addresses 1222-1226. The information in the database 1220 may be shared among the processing nodes 500 via a network that is separate from the network 700 or the network 700 may be used. If the network 700 is used, special fields may be added to specifically that the communication signal is network related and not communication signals among child devices. For example, all address of below sub-networks/child device may be set to a fixed reserved pattern such as "1 . . . 1" to indicate that the communication signal is directed to the processing node of the lowest level sub-network addressed.

The database 1220 may be further organized into blocks 1240-1242 of entries where all the entries within each block may be substituted for each other. For example communication signals having a first portion address that corresponds to the first portion address 1222 may also be destined to first portion address 1224. The structure of the network 700 is configured so that all the sub-networks reachable via the above sub-networks of the first portion address 1222 is also reachable via the above sub-networks of the first portion address 1224. For example, in FIG. 19, the first portion address that includes SN112 and SN120 is also reachable via the first portion address that includes SN110 and SN120. Thus, the above first portions addresses may be in a same block in the database 1220.

Returning to the example, after the information relating to the first address portion 1222 of the communication signal is retrieved, the procession module 900 of sub-network SN102 determines whether the communication signal should be set to the addressed above sub-network or other possible above sub-networks that in the same block 1240-1242 of the database 1220. For this example, the field 1232 corresponding to the first portion address of SN112 indicates heavy congestion and the field 1232 corresponding to SN110 does not indicate congestion. Thus, the processing module 900 replaces the first portion address that was received from the child device with a new first portion address and redirects the communication signal to an appropriate processing node 500 of the sub-network SN110. In this way, traffic load of the network 700 may be balanced without compromising local address processing that achieves processing efficiency.

FIG. 23 is an exemplary block diagram of the processing module 900 of the processing node 500 of FIG. 8. As shown in FIG. 23, the processing module 900 includes a medium interface 510, a transmitter 902, a receiver 903, a controller 904, a memory 905, a database 906, an input/output interface 520, a frequency/wavelength assignor 909 and a buffer queue manager 910. These elements are in communication with one another via the bus 907 or other connection type. FIG. 23 is only an exemplary block diagram of the processing module 900 and is not meant to limit the invention to anyone architecture. Other architectures are possible without departing from the spirit and scope of this invention.

When communication signals are routed to the processing node 500 from an above or a same sub-network, the communication signals are received by the receiver 903 through the medium interface 510 of the processing node 500. The receiver 903 stores the communication signals in the memory 905 based on commands of the buffer queue manager 910. The buffer queue manager 910 may manage communication signal data corresponding to the received communication signals according to any number of buffer management schemes such as based on a priority of the communication signals. The priority scheme may assign priorities to the received communication signals based on various factors including the source of the communication signals, processing load, and the like. Once communication signal data is determined to be next in the queue by the buffer queue manager 910, the controller 904 performs processing on the communication signal data and sends the communication signal data to appropriate destination below sub-networks or child devices.

Communication signals, that are not assigned express frequencies/wavelengths, from user devices or from lower layer processing nodes are received through the input/output interface 520 and are stored in memory 905 in the same manner as described above. Alternatively, express communication signals are routed via communication links 532 and 534 shown in FIG. 6, to and from the medium interface 510 and bypass the processing module 900 altogether.

The controller 904 performs processing on the address information of the communication signal data in the manner set forth above. Specifically, the controller 904 reads the appropriate address information ADD1, ADD2, ADD3, ADD4 from the appropriate address fields 1101-1104. The controller 904 compares this address information to information stored in database 906. The database 906 stores information that identifies the processing nodes of the sub-network to which the present processing node belongs, processing nodes of the sub-network immediately below the present processing node, and the parent processing node in the sub-network immediately above the present processing node.

Depending on the results of the comparison, the controller 904 instructs the transmitter 902 to transmit, through the medium interface 510, the communication signal data to another processing node in the same sub-network, the parent processing node in the layer above the current layer, or a processing node in a layer below the current layer through the input/output interface 520. The frequency/wavelength assignor 909 assigns a frequency/wavelength to the communication signals that are to be transmitted by the transmitter 902 based on which processing node is to receive the communication signals or whether the communication signals are to be sent to the parent processing node.

Figure 24:
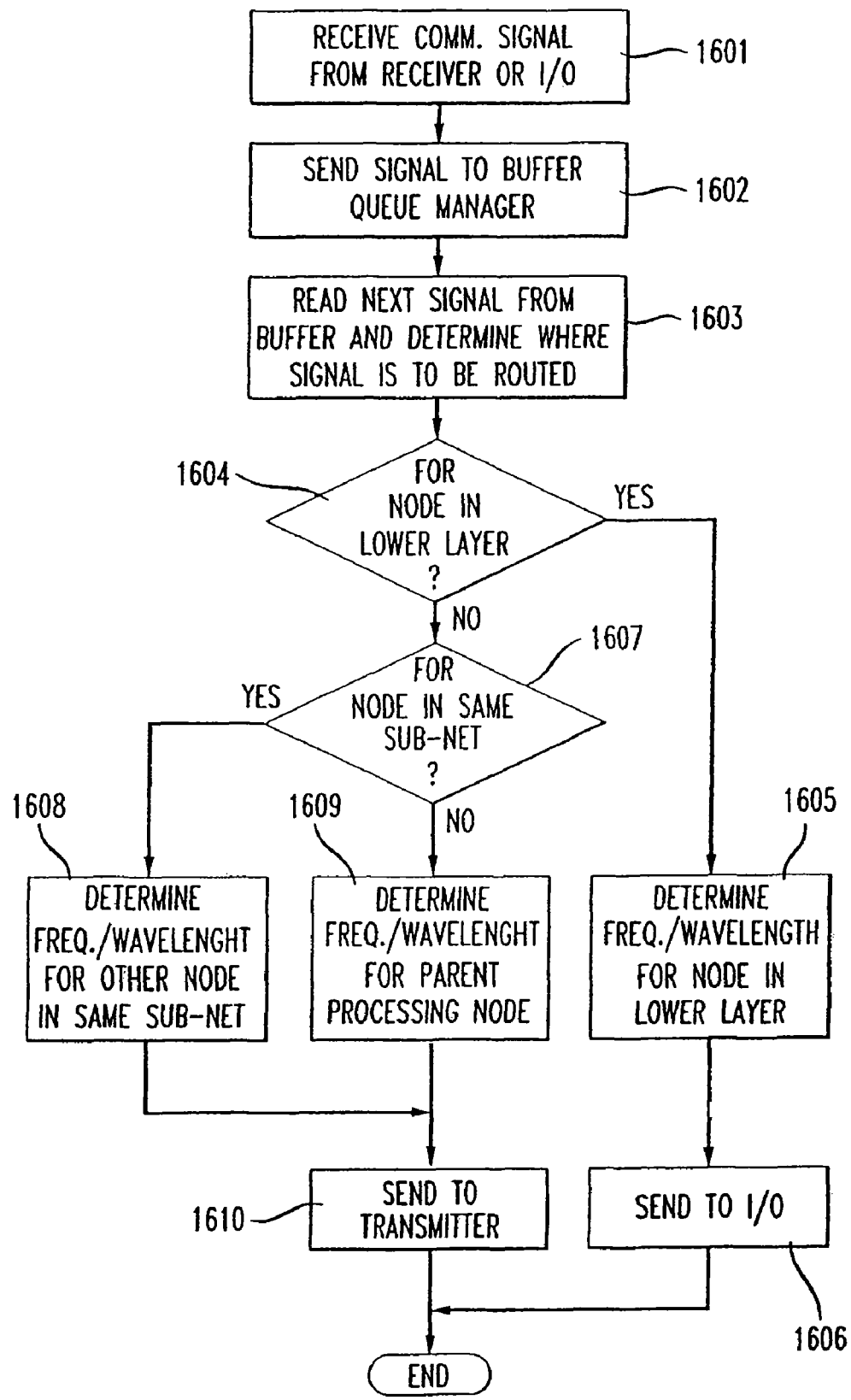
FIG. 24 is an exemplary flowchart of the operation of the processing module of FIG. 23.

FIG. 24 is an exemplary flowchart of the operation of the processing module 900 of FIG. 23. In step 1601, the processing module 900 receives the communication signal through the receiver 903 or the input/output interface 520, depending on the source of the communication signal. The receiver 903 or input/output interface 520 receives the communication signal and extracts the communication signal data including the address information from the communication signal. Control proceeds to step 1602 where the communication signal data is forwarded to the buffer queue manager 910 which stores the communication signal data in memory 905 according to a prioritization scheme, for example.

Next, in step 1603, the controller 904 reads the next signal data from the memory 905 and processes the address information to determine where the communication signal is to be routed. Control continues to step 1604 where the controller 904 determines if the communication signal is to be routed to a processing node in a lower layer of the network. If so, the controller 904 goes to step 1605; otherwise, the controller 904 goes to step 1607.

In step 1605, the controller 904 instructs the frequency/wavelength assignor 909 to assign a frequency/wavelength for the communication signal based on the processing node to which the communication signal is to be sent. The controller 904 then proceeds to step 1606 where the communication signal is sent to the input/output interface 520 using the assigned frequency/wavelength.

In step 1607, the controller 904 determines if the communication signals are to be sent to a processing node in the same sub-network. If so, controller 904 goes to step 1608; otherwise, controller 904 goes to step 1609. In step 1608 the controller 904 determines a frequency/wavelength for the communication signal based on the processing node in the same sub-network to which the communication signal is to be sent, and controller 904 continues to step 1610.

In step 1609, the controller 904 determines a frequency/wavelength for the parent processing node and goes to step 1610. In step 1610 the controller 904 sends the communication signal data to the transmitter 902 for transmission as a communication signal to either the parent processing node or a processing node in the same sub-network.

As shown in FIG. 23, the processing module 900 may be implemented on a general purpose or special purpose computer. However, the processing module 900 can also be implemented on a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIG. 24 can be used to implement the processing module of this invention.

While this invention has been described with specific embodiments thereof, it is evident that many alternatives modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for configuring a network, comprising:
   grouping processing nodes of the network into a plurality of sub-networks;
   organizing the plurality of sub-networks into layers where sub-networks within each layer are not directly coupled to each other;
   coupling processing nodes of a layer to a processing node of an above sub-network of an upper layer, unless the layer is a top layer, and a processing node of a below sub-network of a lower layer, unless the layer is a child device; and
   providing a by-pass path of a processing module within each of the processing nodes such that when an express carrier signal is detected in a communication signal the processing module is bypassed via the by-pass path to a second processing module such that the communication signal is forwarded to the second processing module.

2. The method of claim 1, further comprising coupling each processing node of each sub-network to one other processing node of the sub-network.

3. The method of claim 1, further comprising:
   coupling each processing node of a sub-network to one processing node of an immediately above sub-network; and
   coupling each processing node of the sub-network to a processing node of a below-sub-network.

4. The method of claim 1, further comprising:
   coupling only one processing node of a sub-network to a processing node of an immediately above sub-network; and
   coupling a processing node of the sub-network to one processing node of a below-sub-network.

5. The method of claim 1, further comprising:
   partitioning an address space of the network to correspond to the layers of sub-networks; and
   identifying a first portion address, a second portion address, and a third portion address of an address of the address space, wherein the first portion address corresponds to processing nodes of above sub-networks, the second portion address corresponds to processing nodes of same sub-networks, and the third portion address corresponds to below sub-networks.

6. The method of claim 1, wherein the coupling the processing nodes of a layer further comprises:
   coupling processing nodes of a layer to a processing node of a plurality of above sub-networks of an upper layer, unless the layer is a top layer.

7. The method of claim 1, wherein the network is a telecommunications network.

8. A network, comprising:
   a first layer of processing nodes; and
   a second layer of processing nodes, wherein:
   the processing nodes of each of the first and second layers are organized into sub-networks comprised of processing nodes and each of the processing nodes includes a by-pass path of a processing module within each of the processing nodes such that when an express carrier signal is detected in a communication signal the processing module is bypassed via the by-pass path to a second processing module such that the communication signal is forwarded to the second processing module;
   sub-networks of a same layer are not directly coupled to each other; and
   a processing node of each sub-network of the second layer is coupled to a processing node of a sub-network in the first layer, unless the second layer is a top layer, and to a processing node of a sub-network in a third layer.

9. The network of claim 8, wherein the network is a telecommunications network.

10. The network of claim 9, further comprising:
means for partitioning an address space of the telecommunication network to correspond to the layers of sub-networks; and
means for identifying a first portion address, a second portion address, and a third portion address of an address of the address space, wherein the first portion address corresponds to processing nodes of above sub-networks, the second portion address corresponds to processing nodes of same sub-networks, and the third portion address corresponds to below sub-networks.

11. The network of claim 9, further comprising:
means for partitioning an address space of the telecommunication network to correspond to the layers of sub-networks; and
means for identifying a first portion address, a second portion address, and a third portion address of an address of the address space, wherein the first portion address corresponds to processing nodes of above sub-networks, the second portion address corresponds to processing nodes of same sub-networks, and the third portion address corresponds to child devices.

12. The method of claim 1, further comprising:
partitioning an address space of the network to correspond to the layers of sub-networks; and
identifying a first portion address, a second portion address, and a third portion address of an address of the address space, wherein the first portion address corresponds to processing nodes of above sub-networks, the second portion address corresponds to processing nodes of same sub-networks, and the third portion address corresponds to child devices.

* * * * *